(12) United States Patent
Kawai et al.

(10) Patent No.: US 11,609,420 B2
(45) Date of Patent: Mar. 21, 2023

(54) WAFER

(71) Applicant: HAMAMATSU PHOTONICS K.K., Hamamatsu (JP)

(72) Inventors: Toshimitsu Kawai, Hamamatsu (JP); Katsumi Shibayama, Hamamatsu (JP); Takashi Kasahara, Hamamatsu (JP); Masaki Hirose, Hamamatsu (JP); Hiroki Oyama, Hamamatsu (JP); Yumi Kuramoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 17/861,721

(22) Filed: Jul. 11, 2022

(65) Prior Publication Data

US 2022/0350131 A1    Nov. 3, 2022

Related U.S. Application Data

(63) Continuation of application No. 16/765,547, filed as application No. PCT/JP2018/041732 on Nov. 9, 2018, now Pat. No. 11,448,869.

(30) Foreign Application Priority Data

Nov. 24, 2017    (JP) .................................. 2017-226085

(51) Int. Cl.
    *G02B 26/00* (2006.01)
(52) U.S. Cl.
    CPC .................................. *G02B 26/00* (2013.01)
(58) Field of Classification Search
    CPC .................................................. G02B 26/001
    See application file for complete search history.

(56) References Cited

U.S. PATENT DOCUMENTS 5,784,507 A * 7/1998 Holm-Kennedy ... G02B 6/1228
                                                    385/36
2003/0205221 A1   11/2003 Leu
(Continued)

FOREIGN PATENT DOCUMENTS

CN         1469154 A    1/2004
CN       105992964 A    10/2016
(Continued)

OTHER PUBLICATIONS

International Preliminary Report on Patentability dated Jun. 4, 2020 for PCT/JP2018/041732.

*Primary Examiner* — Anne M Hines
(74) *Attorney, Agent, or Firm* — Faegre Drinker Biddle & Reath LLP

(57) ABSTRACT

A wafer includes a substrate layer, a first mirror layer having a plurality of two-dimensionally arranged first mirror portions, and a second mirror layer having a plurality of two-dimensionally arranged second mirror portions. A plurality of Fabry-Perot interference filter portions are formed in an effective area, in each of the plurality of Fabry-Perot interference filter portions a gap is formed between the first mirror portion and the second mirror portion. A plurality of dummy filter portions are formed in a dummy area disposed along an outer edge of the substrate layer and surrounding the effective area, in each of the plurality of dummy filter portions an intermediate layer is provided between the first mirror portion and the second mirror portion. At least the second mirror portion is surrounded by the first groove in each of the plurality of Fabry-Perot interference filter portions and the plurality of dummy filter portions.

6 Claims, 19 Drawing Sheets

(56) References Cited

U.S. PATENT DOCUMENTS

| | | |
|---|---|---|
| 2004/0014300 A1 | 1/2004 | Kouma et al. |
| 2006/0066856 A1 | 3/2006 | Cummings et al. |
| 2012/0181647 A1 | 7/2012 | Blomberg |
| 2014/0191116 A1 | 7/2014 | Sano et al. |
| 2014/0263983 A1 | 9/2014 | Hirokubo |

FOREIGN PATENT DOCUMENTS

| | | |
|---|---|---|
| EP | 1544161 A1 | 6/2005 |
| EP | 3018521 A1 | 5/2016 |
| JP | 2003-131024 A | 5/2003 |
| JP | 2004-053850 A | 2/2004 |
| JP | 2004-069733 A | 3/2004 |
| JP | 2009-147108 A | 7/2009 |
| JP | 2012-209635 A | 10/2012 |
| JP | 2013-506154 A | 2/2013 |
| JP | 2015-11311 A | 1/2015 |
| JP | 2016-007692 A | 1/2016 |
| JP | 2016-99583 A | 5/2016 |
| JP | 2016-211860 A | 12/2016 |
| JP | 2017-181814 A | 10/2017 |
| WO | WO 2011/036346 A1 | 3/2011 |
| WO | WO 2016/176735 A1 | 11/2016 |

\* cited by examiner

WAFER

TECHNICAL FIELD

The present disclosure relates to a wafer for obtaining a Fabry-Perot interference filter.

BACKGROUND ART

In the related art, a Fabry-Perot interference filter including a substrate, a fixed mirror and a movable mirror facing each other via a gap on the substrate is known (for example, refer to Patent Literature 1).

CITATION LIST

Patent Literature

Patent Literature 1: Japanese Unexamined Patent Publication No. 2013-506154

SUMMARY OF INVENTION

Technical Problem

Since a Fabry-Perot interference filter as described above is a fine structure, it is difficult to improve both manufacturing efficiency and a yield when a Fabry-Perot interference filter is manufactured.

Therefore, the present disclosure aims to provide a wafer capable of obtaining a plurality of Fabry-Perot interference filters with high efficiency and high yield.

Solution to Problem

A wafer according to one aspect of the present disclosure includes: a substrate layer having a first surface and a second surface opposite to the first surface; a first mirror layer having a plurality of first mirror portions two-dimensionally arranged on the first surface; and a second mirror layer having a plurality of second mirror portions two-dimensionally arranged on the first mirror layer, in which a plurality of Fabry-Perot interference filter portions are formed in an effective area, in each of the plurality of Fabry-Perot interference filter portions a gap is formed between the first mirror portion and the second mirror portion facing each other and a distance between the first mirror portion and the second mirror portion facing each other varies by an electrostatic force, a plurality of dummy filter portions are formed in a dummy area disposed along an outer edge of the substrate layer and surrounding the effective area, in each of the plurality of dummy filter portions an intermediate layer is provided between the first mirror portion and the second mirror portion facing each other, and at least the second mirror portion is surrounded by a first groove opening on a side opposite to the substrate layer in each of the plurality of Fabry-Perot interference filter portions and the plurality of dummy filter portions.

In this wafer, a plurality of Fabry-Perot interference filter portions to be a plurality of Fabry-Perot interference filters is provided in the effective area. In addition, a plurality of dummy filter portions is provided in the dummy area desposed along an outer edge of the substrate layer and surrounding the effective area. In each of the dummy filter portions, an intermediate layer is provided between the first mirror portion and the second mirror portion facing each other. This configuration sufficiently ensures the strength of the entire wafer. This facilitates handling of the wafer when cutting out a plurality of Fabry-Perot interference filters from the wafer, for example. The presence of a gap formed between the first mirror portion and the second mirror portion facing each other in each of the dummy filter portions would lead to a case, for example, where the second mirror portion is damaged when the dummy area of the wafer is gripped by a gripper tool and then fragments of the second mirror portion would adhere to the Fabry-Perot interference filter portion to degrade the appearance and characteristics of the Fabry-Perot interference filter portion. This wafer includes an intermediate layer provided between the first mirror portion and the second mirror portion facing each other in each of the dummy filter portions, and thus, such a situation is suppressed. In each of the Fabry-Perot interference filter portions, at least the second mirror portion is surrounded by the first groove. This improves the yield in cutting out a plurality of Fabry-Perot interference filters from the wafer. Furthermore, at least the second mirror portion is surrounded by the first groove in each of the dummy filter portions. This can reduce the stress in the dummy area, suppressing the warpage of the wafer. The configuration of the wafer as described above makes it possible to obtain a plurality of Fabry-Perot interference filters with high efficiency and with high yield.

In the wafer according to one aspect of the present disclosure, the first groove may be continuous through the effective area and the dummy area and may reach an outer edge of the substrate layer when viewed in the direction in which the first mirror portion and the second mirror portion face each other. With this configuration, it is possible to further improve the yield at the time of cutting out a plurality of Fabry-Perot interference filters from the wafer and possible to further reliably suppress the warpage of the wafer.

The wafer according to one aspect of the present disclosure may further include a stress adjustment layer provided on the second surface, second groove opening on the opposite side of the substrate layer may be formed in the stress adjustment layer, and the second groove may be formed so as to correspond to the first groove. With this configuration, it is possible to further improve the yield at the time of cutting out a plurality of Fabry-Perot interference filters from the wafer and possible to further reliably suppress the warpage of the wafer.

In the wafer according to one aspect of the present disclosure, the plurality of Fabry-Perot interference filter portions and the plurality of dummy filter portions may be disposed so as to be symmetric about each of a first straight line and a second straight line passing through the center of the substrate layer and orthogonal to each other when viewed in the direction in which the first mirror portion and the second mirror portion face each other. This makes it possible to more reliably suppress the warpage of the entire wafer.

In the wafer according to one aspect of the present disclosure, a modified region may be formed inside the substrate layer so as to correspond to the first groove. This enables extension of a fracture from the modified region in a thickness direction of the substrate layer, making it possible to easily and accurately cut out a plurality of Fabry-Perot interference filters from the wafer.

The wafer according to one aspect of the present disclosure may further include an expanding tape attached to a second surface side with respect to the substrate layer. This facilitates wafer handling even in a state where the modified region is formed inside the substrate layer.

In the wafer according to one aspect of the present disclosure, a mirror-removed portion is formed in a portion of the dummy area, in the mirror-removed portion at least a portion of the second mirror portion may be removed. With this configuration, in a case where a plurality of through-holes is to be formed in the second mirror portion in a portion corresponding to each of the Fabry-Perot interference filter portions in order to form a gap by etching between the first mirror portion and the second mirror portion facing each other, for example, it is possible, by monitoring the removal state of the second mirror portion in a portion corresponding to the mirror-removed portion, to reliably form the plurality of through-holes in the second mirror portion at a portion corresponding to each of the Fabry-Perot interference filter portions. This makes it possible to achieve a wafer including a plurality of Fabry-Perot interference filter portions, each of the plurality of Fabry-Perot interference filter portions in which a gap is reliably formed between the first mirror portion and the second mirror portion facing each other.

In the wafer according to one aspect of the present disclosure, at least the first mirror portion may be surrounded by the first groove in the mirror-removed portion. This can reduce the stress also in the mirror-removed portion, suppressing the warpage of the wafer.

In the wafer according to one aspect of the present disclosure, the mirror-removed portions may be provided in plurality along the outer edge of the substrate layer in the dummy area, the first groove may be continuous through the effective area and the dummy area and may reach the outer edge of the substrate layer when viewed in the direction in which the first mirror portion and the second mirror portion face each other. With this configuration, the plurality of dummy filter portions is arranged outside the plurality of Fabry-Perot interference filter portions, and the plurality of mirror-removed portions is arranged outside the plurality of dummy filter portions, and the first groove is also continuous to reach the outer edge of the substrate layer, leading to improvement of the stress balance of the entire wafer, making it possible to further reliably suppress the warpage of the wafer.

Advantageous Effects of Invention

According to the present disclosure, it is possible to provide a wafer capable of obtaining a plurality of Fabry-Perot interference filters with high efficiency and high yield.

DESCRIPTION OF EMBODIMENTS

Figure 1:
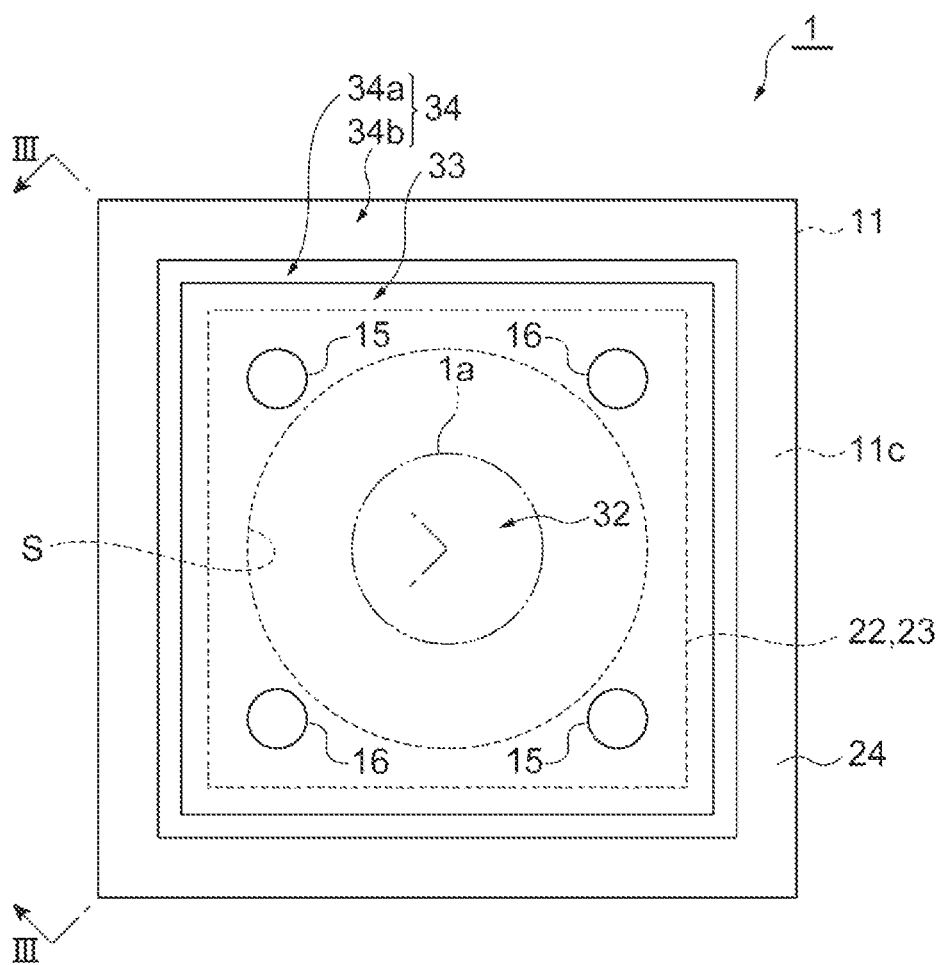
FIG. 1 is a plan view of a Fabry-Perot interference filter cut out from a wafer according to an embodiment.

Hereinafter, an embodiment of the present disclosure will be described in detail with reference to the drawings. In all the drawings, the same or equivalent portions are denoted with the same reference numerals and duplicated description is omitted.

[Configuration of Fabry-Perot Interference Filter and Dummy Filter]

Prior to the description of the configuration of the wafer of one embodiment, the configuration of each of the Fabry-Perot interference filter and the dummy filter cut out from the wafer will be described.

Figure 2:
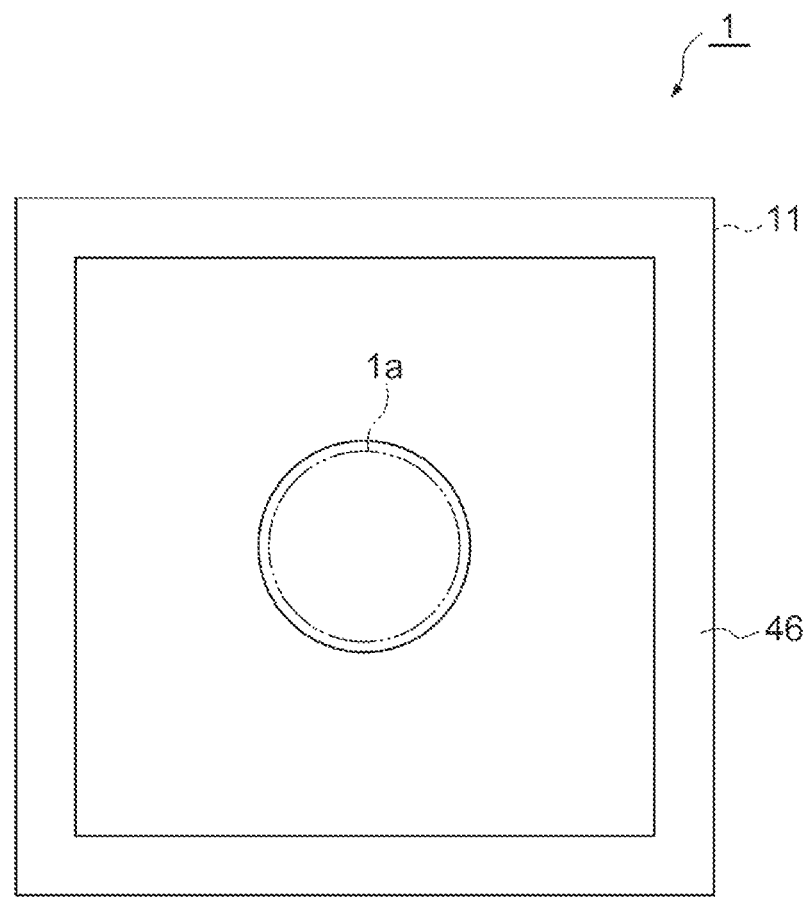
FIG. 2 is a bottom view of a Fabry-Perot interference filter illustrated in FIG. 1.
Figure 3:
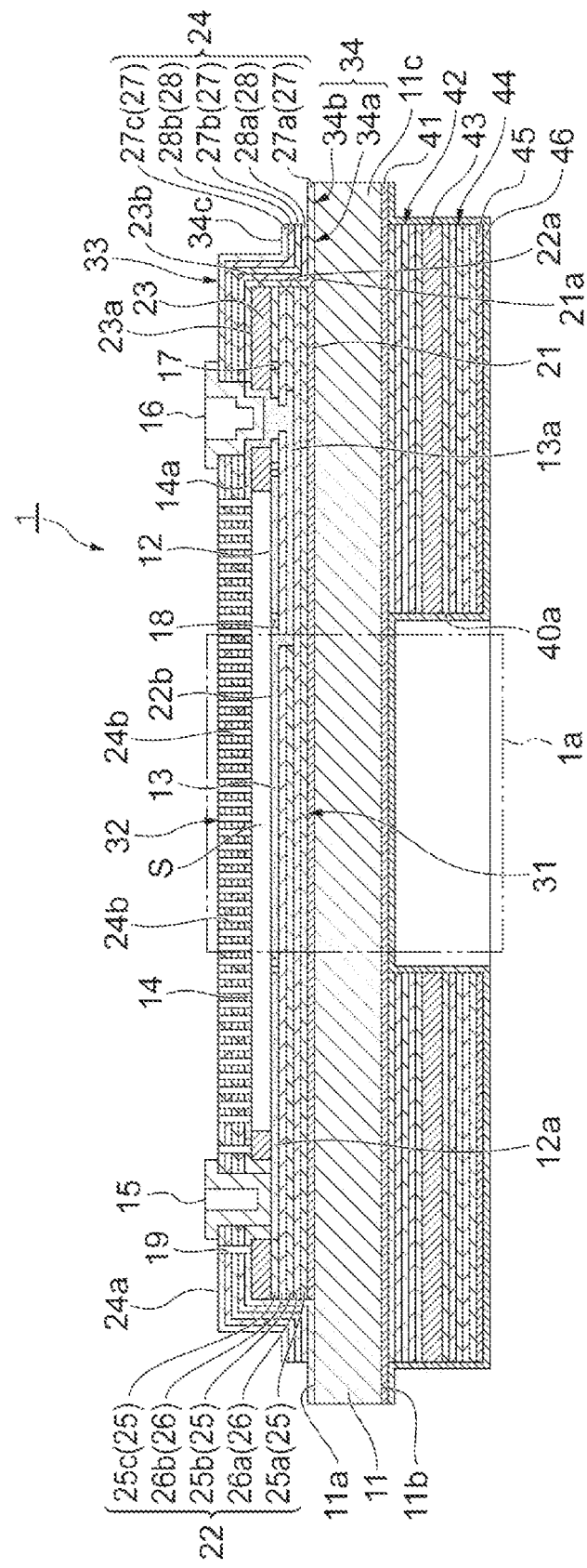
FIG. 3 is a cross-sectional view of the Fabry-Perot interference filter taken along line in FIG. 1.

As illustrated in FIGS. 1, 2, and 3, a Fabry-Perot interference filter 1 includes a substrate 11. The substrate 11 has a first surface 11a and a second surface 11b opposite to the first surface 11a. On the first surface 11a, a reflection prevention layer 21, a first laminate 22, an intermediate layer 23, and a second laminate 24 are laminated in this order. A gap (air gap) S is defined between the first laminate 22 and the second laminate 24 by the frame-shaped intermediate layer 23.

The shape and the positional relationship of individual portions when viewed in a direction perpendicular to the first surface 11a (plan view) are as follows. The outer edge of the substrate 11 has a rectangular shape with a side being several hundred μm to several mm. The outer edge of the substrate 11 and an outer edge of the second laminate 24 are aligned with each other. An outer edge of the reflection prevention layer 21, an outer edge of the first laminate 22, and an outer edge of the intermediate layer 23 are aligned with each other. The substrate 11 has an outer edge portion 11c positioned on an outer side of the outer edge of the intermediate layer 23 with respect to the center of the gap S. For example, the outer edge portion 11c has a frame shape and surrounds the intermediate layer 23 when viewed in a direction perpendicular to the first surface 11a. The gap S has a circular shape, for example.

The Fabry-Perot interference filter 1 transmits light having a predetermined wavelength through a light transmission region 1a defined in a center portion of the Fabry-Perot interference filter 1. The light transmission region 1a is a columnar region, for example. The substrate 11 is formed of silicon, quartz, or glass, for example. When the substrate 11 is formed of silicon, the reflection prevention layer 21 and the intermediate layer 23 are formed of silicon oxide, for example. The thickness of the intermediate layer 23 ranges from several tens of nm to several tens of μm, for example.

A portion corresponding to the light transmission region 1a in the first laminate 22 functions as a first mirror portion 31. The first mirror portion 31 is a fixed mirror. The first mirror portion 31 is disposed on the first surface 11a via the reflection prevention layer 21. The first laminate 22 includes alternate laminations of each of a plurality of polysilicon layers 25 and each of a plurality of silicon nitride layers 26. The Fabry-Perot interference filter 1 includes layers of a polysilicon layer 25a, a silicon nitride layer 26a, a polysilicon layer 25b, a silicon nitride layer 26b, and a polysilicon layer 25c laminated on the reflection prevention layer 21 in this order. The optical thickness of each of the polysilicon layers 25 and the silicon nitride layers 26 included in the first mirror portion 31 is preferably an integral multiple of ¼ of a center transmission wavelength. The first mirror portion 31 may be directly disposed on the first surface 11a without interposing the reflection prevention layer 21.

The portion corresponding to the light transmission region 1a in the second laminate 24 functions as a second mirror portion 32. The second mirror portion 32 is a movable mirror. The second mirror portion 32 faces the first mirror portion 31 via the gap S on a side opposite to the substrate 11 with respect to the first mirror portion 31. The direction in which the first mirror portion 31 and the second mirror portion 32 face each other is parallel to a direction perpendicular to the first surface 11a. The second laminate 24 is disposed on the first surface 11a via the reflection prevention layer 21, the first laminate 22, and the intermediate layer 23. The second laminate 24 includes alternate laminations of each of the plurality of polysilicon layers 27 and each of the plurality of silicon nitride layers 28. The Fabry-Perot interference filter 1 includes layers of a polysilicon layer 27a, a silicon nitride layer 28a, a polysilicon layer 27b, a silicon nitride layer 28b, and a polysilicon layer 27c laminated on the intermediate layer 23 in this order. The optical thickness of each of the polysilicon layer 27 and the silicon nitride layer 28 included in the second mirror portion 32 is preferably an integral multiple of ¼ of the center transmission wavelength.

In the first laminate 22 and the second laminate 24, silicon oxide layers may be used in place of the silicon nitride layers. In addition, examples of the material applicable for each of layers forming the first laminate 22 and the second laminate 24 include titanium oxide, tantalum oxide, zirconium oxide, magnesium fluoride, aluminum oxide, calcium fluoride, silicon, germanium, zinc sulfide, or the like. Here, the surface of the first mirror portion 31 on the gap S side (surface of the polysilicon layer 25c) and the surface of the second mirror portion 32 on the gap S side (surface of the polysilicon layer 27a) directly face each other via the gap S. Note that an electrode layer, a protective layer, or the like (not forming a mirror) may be formed on the surface of the first mirror portion 31 on the gap S side and on the surface of the second mirror portion 32 on the gap S side. In this case, the first mirror portion 31 and the second mirror portion 32 face each other via the gap S with the presence of these interposed layers. In other words, even in such a case, a facing configuration between the first mirror portion 31 and the second mirror portion 32 via the gap S can be achieved.

A plurality of through-holes 24b is formed at a portion of the second laminate 24 corresponding to the gap S (a portion overlapping the gap S when viewed in a direction perpendicular to the first surface 11a). Each of the through-holes 24b extends to reach the gap S from a surface 24a of the second laminate 24 opposite to the intermediate layer 23. The plurality of through-holes 24b is formed so as not to substantially influence the function of the second mirror portion 32. The plurality of through-holes 24b is used for forming the gap S by removing a portion of the intermediate layer 23 through etching.

In addition to the second mirror portion 32, the second laminate 24 further includes a covering portion 33 and a peripheral edge portion 34. The second mirror portion 32, the covering portion 33, and the peripheral edge portion 34 are integrally formed to have a portion of a same laminated structure and to be continuous to each other. The covering portion 33 surrounds the second mirror portion 32 when viewed in a direction perpendicular to the first surface 11a. The covering portion 33 covers a surface 23a of the intermediate layer 23 on a side opposite to the substrate 11, a side surface 23b of the intermediate layer 23 (a side surface on the outer side, that is, a side surface on a side opposite to the gap S side), a side surface 22a of the first laminate 22, and a side surface 21a of the reflection prevention layer 21, so as to reach the first surface 11a. That is, the covering portion 33 covers the outer edge of the intermediate layer 23, the outer edge of the first laminate 22, and the outer edge of the reflection prevention layer 21.

The peripheral edge portion 34 surrounds the covering portion 33 when viewed in a direction perpendicular to the first surface 11a. The peripheral edge portion 34 is positioned on the first surface 11a in the outer edge portion 11c. The outer edge of the peripheral edge portion 34 is aligned with the outer edge of the substrate 11 when viewed in a direction perpendicular to the first surface 11a. The peripheral edge portion 34 is thinned along an outer edge of the outer edge portion 11c. That is, the portion along the outer edge of the outer edge portion 11c in the peripheral edge portion 34 is thinner compared to other portions excluding the portion along the outer edge of the peripheral edge portion 34. In the Fabry-Perot interference filter 1, the peripheral edge portion 34 is thinned by removing a portion of the polysilicon layer 27 and the silicon nitride layer 28 included in the second laminate 24. The peripheral edge portion 34 includes: a non-thinned portion 34a continuous to the covering portion 33; and a thinned portion 34b surrounding the non-thinned portion 34a. In the thinned portion 34b, the polysilicon layer 27 and the silicon nitride layer 28 are removed excluding the polysilicon layer 27a directly provided on the first surface 11a.

The height from the first surface 11a to a surface 34c of the non-thinned portion 34a on a side opposite to the substrate 11 is lower than the height from the first surface 11a to the surface 23a of the intermediate layer 23. The height from the first surface 11a to the surface 34c of the non-thinned portion 34a ranges from 100 nm to 5000 nm, for example. The height from the first surface 11a to the surface 23a of the intermediate layer 23 ranges from 500 nm to 20000 nm, for example. The width of the thinned portion 34b (distance between the outer edge of the non-thinned portion 34a and the outer edge of the outer edge portion 11c when viewed in the direction perpendicular to the first surface 11a) is 0.01 times the thickness of the substrate 11, or more. The width of the thinned portion 34b ranges from 5 μm to 400 μm, for example. The thickness of the substrate 11 ranges from 500 μm to 800 μm, for example.

A first electrode 12 is formed in the first mirror portion 31 so as to surround the light transmission region 1a when viewed in a direction perpendicular to the first surface 11a. The first electrode 12 is formed by doping impurities into the polysilicon layer 25c to achieve low resistivity. A second electrode 13 is formed in the first mirror portion 31 so as to include the light transmission region 1a when viewed in a direction perpendicular to the first surface 11a. The second electrode 13 is formed by doping impurities into the polysilicon layer 25c to achieve low resistivity. Note that although it is preferable that the second electrode 13 is sized to include the entire light transmission region 1a when viewed in a direction perpendicular to the first surface 11a, the second electrode 13 may have substantially the same size as that of the light transmission region 1a.

A third electrode 14 is formed in the second mirror portion 32. The third electrode 14 faces the first electrode 12 and the second electrode 13 via the gap S. The third electrode 14 is formed by doping impurities into the polysilicon layer 27a to achieve low resistivity.

A pair of terminals 15 are provided to face each other across the light transmission region 1a. Each of the terminals 15 is disposed inside a through-hole from the surface 24a of the second laminate 24 to the first laminate 22. Each of the terminals 15 is electrically connected to the first electrode 12 through wiring 12a. For example, each of the terminals 15 is formed with a metal film of aluminum, an alloy thereof, or the like.

A pair of terminals 16 are provided to face each other across the light transmission region 1a. Each of the terminals 16 is disposed inside a through-hole from the surface 24a of the second laminate 24 to the first laminate 22. Each of the terminals 16 is electrically connected to the second electrode 13 through wiring 13a and is electrically connected to the third electrode 14 through wiring 14a. For example, the terminals 16 are formed with a metal film of aluminum, an alloy thereof, or the like. The facing direction of the pair of terminals 15 and the facing direction of the pair of terminals 16 are orthogonal to each other (refer to FIG. 1).

A plurality of trenches 17 and 18 is provided on a surface 22b of the first laminate 22. The trench 17 annularly extends to surround a connection with respect to the terminals 16 in the wiring 13a. The trench 17 electrically insulates the first electrode 12 and the wiring 13a from each other. The trench 18 annularly extends along an inner edge of the first electrode 12. The trench 18 electrically insulates the first electrode 12 and an inner region of the first electrode 12 (second electrode 13) from each other. Each of the regions within the trenches 17 and 18 may be an insulating material or a gap.

A trench 19 is provided on the surface 24a of the second laminate 24. The trench 19 annularly extends to surround the terminals 15. The trench 19 electrically insulates the terminals 15 and the third electrode 14 from each other. The region inside the trench 19 may be an insulating material or a gap.

The second surface 11b of the substrate 11 includes layers of a reflection prevention layer 41, a third laminate 42, an intermediate layer 43, and a fourth laminate 44 laminated in this order. The reflection prevention layer 41 and the intermediate layer 43 each have a configuration similar to those of the reflection prevention layer 21 and the intermediate layer 23. The third laminate 42 and the fourth laminate 44 each have a laminated structure symmetrical to those of the first laminate 22 and the second laminate 24 with respect to the substrate 11. The reflection prevention layer 41, the third laminate 42, the intermediate layer 43, and the fourth laminate 44 have a function of suppressing warpage of the substrate 11.

The third laminate 42, the intermediate layer 43, and the fourth laminate 44 are thinned along an outer edge of the outer edge portion 11c. That is, the portion along the outer edge of the outer edge portion 11c in the third laminate 42, the intermediate layer 43, and the fourth laminate 44 is thinner compared to other portions excluding the portion along the outer edge in the third laminate 42, the intermediate layer 43, and the fourth laminate 44. In the Fabry-Perot interference filter 1, the third laminate 42, the intermediate layer 43, and the fourth laminate 44 are thinned by removing all of the third laminate 42, the intermediate layer 43, and the fourth laminate 44 in a portion overlapping the thinned portion 34b when viewed in a direction perpendicular to the first surface 11a.

The third laminate 42, the intermediate layer 43, and the fourth laminate 44 have an opening 40a so as to include the light transmission region 1a when viewed in a direction perpendicular to the first surface 11a. The opening 40a has a diameter substantially the same as the size of the light transmission region 1a. The opening 40a is open on the light emission side. The bottom surface of the opening 40a reaches the reflection prevention layer 41.

A light shielding layer 45 is formed on a surface of the fourth laminate 44 on the light emission side. For example, the light shielding layer 45 is formed of aluminum or the like. A protective layer 46 is formed on a surface of the light shielding layer 45 and an inner surface of the opening 40a. The protective layer 46 covers outer edges of the third laminate 42, the intermediate layer 43, the fourth laminate 44, and the light shielding layer 45 and covers the reflection prevention layer 41 on the outer edge portion 11c. For example, the protective layer 46 is formed of aluminum oxide. An optical influence due to the protective layer 46 can be disregarded by forming the protective layer 46 in the thickness ranging from 1 nm to 100 nm (preferably, approximately 30 nm).

In the Fabry-Perot interference filter 1 configured as described above, when a voltage is applied between the first electrode 12 and the third electrode 14 via the pair of terminals 15 and 16, an electrostatic force corresponding to the voltage is generated between the first electrode 12 and the third electrode 14. The second mirror portion 32 is attracted to the first mirror portion 31 side secured to the substrate 11 due to the electrostatic force, and the distance between the first mirror portion 31 and the second mirror portion 32 is adjusted. In this manner, in the Fabry-Perot interference filter 1, the distance between the first mirror portion 31 and the second mirror portion 32 varies due to the electrostatic force.

The wavelength of light to be transmitted through the Fabry-Perot interference filter 1 depends on the distance between the first mirror portion 31 and the second mirror portion 32 in the light transmission region 1a. Therefore, the wavelength of light to be transmitted through the Fabry-Perot interference filter 1 can be appropriately selected by adjusting the voltage to be applied between the first electrode 12 and the third electrode 14. At this time, the second electrode 13 has the same potential as that of the third electrode 14. Therefore, the second electrode 13 functions as a compensation electrode to keep the first mirror portion 31 and the second mirror portion 32 flat in the light transmission region 1a.

In the Fabry-Perot interference filter 1, for example, a spectroscopic spectrum can be obtained by detecting light transmitted through the light transmission region 1a of the Fabry-Perot interference filter 1 using a light detector while changing the voltage to be applied to the Fabry-Perot interference filter 1 (that is, while changing the distance between the first mirror portion 31 and the second mirror portion 32 in the Fabry-Perot interference filter 1).

Figure 4:
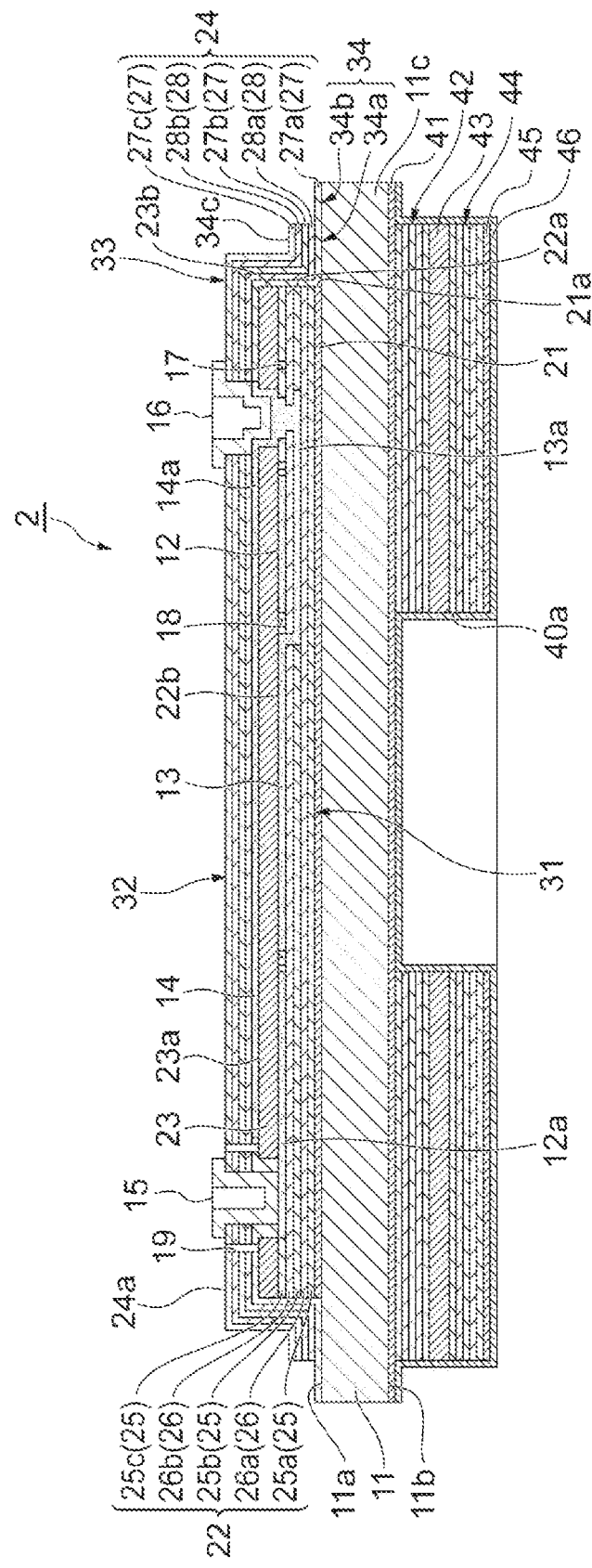
FIG. 4 is a cross-sectional view of a dummy filter cut out from a wafer according to an embodiment.

As illustrated in FIG. 4, the dummy filter 2 is different from the Fabry-Perot interference filter 1 described above in that the plurality of through-holes 24b is not formed in the second laminate 24 and the gap S is not formed in the intermediate layer 23. In the dummy filter 2, an intermediate layer 23 is provided between the first mirror portion 31 and the second mirror portion 32. That is, the second mirror portion 32 is disposed on the surface 23a of the intermediate layer 23, not floating above the gap S.

[Wafer Configuration]

Figure 5:
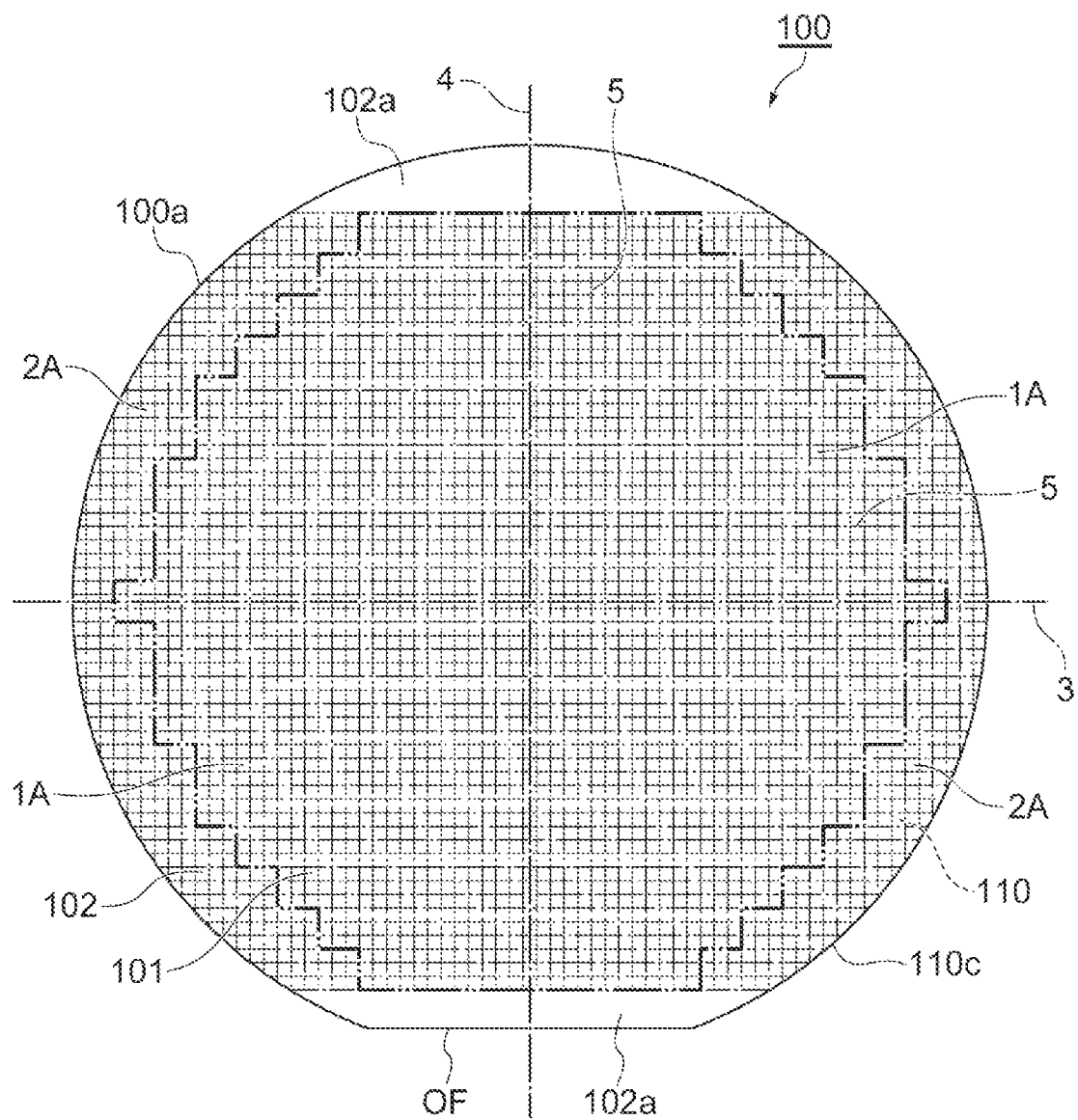
FIG. 5 is a plan view of a wafer according to an embodiment.
Figure 6:
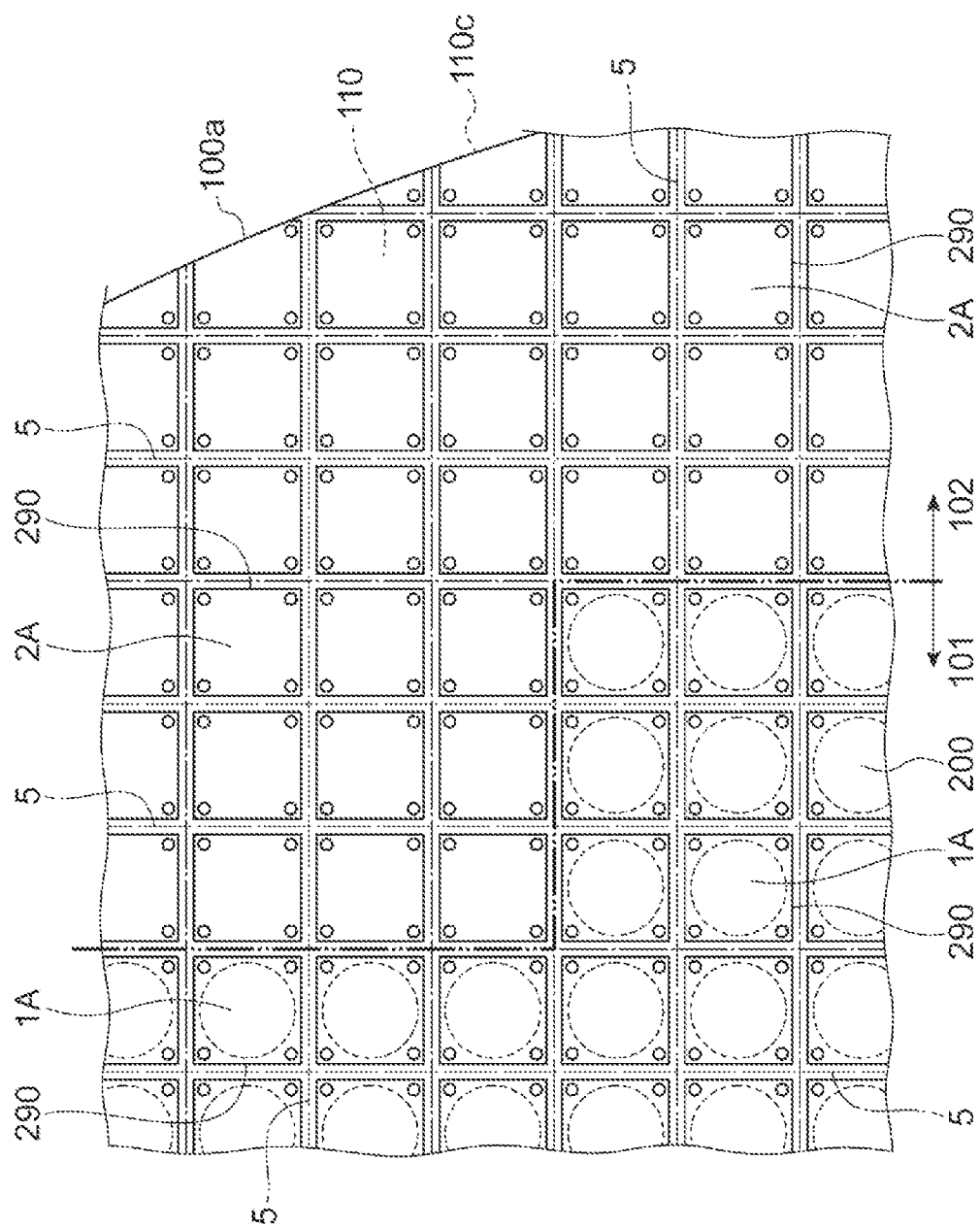
FIG. 6 is an enlarged plan view of a portion of the wafer illustrated in FIG. 5.

Next, a configuration of a wafer according to an embodiment will be described. As illustrated in FIGS. 5 and 6, a wafer 100 includes a substrate layer 110. The substrate layer 110 has a disk shape with a diameter of approximately 150 mm or 200 mm, with an orientation flat OF formed in a portion of the substrate layer 110. For example, the substrate layer 110 is formed of silicon, quartz, glass, or the like. Hereinafter, a virtual straight line that passes through the center of the substrate layer 110 when viewed in the thickness direction of the substrate layer 110 and is parallel to the orientation flat OF is referred to as a first straight line 3, while a virtual straight line that passes through the center of the substrate layer 110 when viewed in the thickness direction of the substrate layer 110 and is perpendicular to the orientation flat OF is referred to as a second straight line 4.

The wafer 100 includes an effective area 101 and a dummy area 102. The dummy area 102 is an area along an outer edge 110c of the substrate layer 110 (that is, the outer edge 100a of the wafer 100). The effective area 101 is an area inside the dummy area 102. The dummy area 102 surrounds the effective area 101 when viewed in the thickness direction of the substrate layer 110. The dummy area 102 is adjacent to the effective area 101.

The effective area 101 includes a plurality of two-dimensionally arranged Fabry-Perot interference filter portions 1A. The plurality of Fabry-Perot interference filter portions 1A is provided in the entire effective area 101. The dummy area 102 includes a plurality of two-dimensionally arranged dummy filter portions 2A. The plurality of dummy filter portions 2A is provided in an area of the dummy area 102 excluding a pair of areas 102a. One area 102a is an area along the orientation flat OF. The other area 102a is an area along the portion of the outer edge 110c of the substrate layer 110 at an opposite side of the orientation flat OF. The Fabry-Perot interference filter portion 1A and the dummy filter portion 2A are adjacent to each other at a boundary between the effective area 101 and the dummy area 102. When viewed in the thickness direction of the substrate layer 110, the outer shape of the Fabry-Perot interference filter portion 1A and the outer shape of the dummy filter portion 2A are the same. The plurality of Fabry-Perot interference filter portions 1A and the plurality of dummy filter portions 2A are arranged so as to be symmetric about each of the first straight line 3 and the second straight line 4 orthogonal to each other. The plurality of dummy filter portions 2A may be provided over the entire dummy area 102. Furthermore, the plurality of dummy filter portions 2A may be provided in an area other than one of the areas 102a in the dummy areas 102.

Each of the plurality of Fabry-Perot interference filter portions 1A is to be each of a plurality of Fabry-Perot interference filters 1 when the wafer 100 is cut along each of lines 5. Each of the plurality of dummy filter portions 2A is to be each of a plurality of dummy filters 2 when the wafer 100 is cut along each of the lines 5. When viewed in the thickness direction of the substrate layer 110, the plurality of lines 5 extends in a direction parallel to the orientation flat OF, and the plurality of lines 5 extends in a direction perpendicular to the orientation flat OF. As an example, when each of the filter portions 1A and 2A has a rectangular shape when viewed in the thickness direction of the substrate layer 110, each of the filter portions 1A and 2A is arranged in a two-dimensional matrix, and the plurality of lines 5 is set in a lattice pattern so as to pass between adjacent filter portions 1A-1A, between adjacent filter portions 1A-2A, and between adjacent filter portions 2A-2A.

Figure 7:
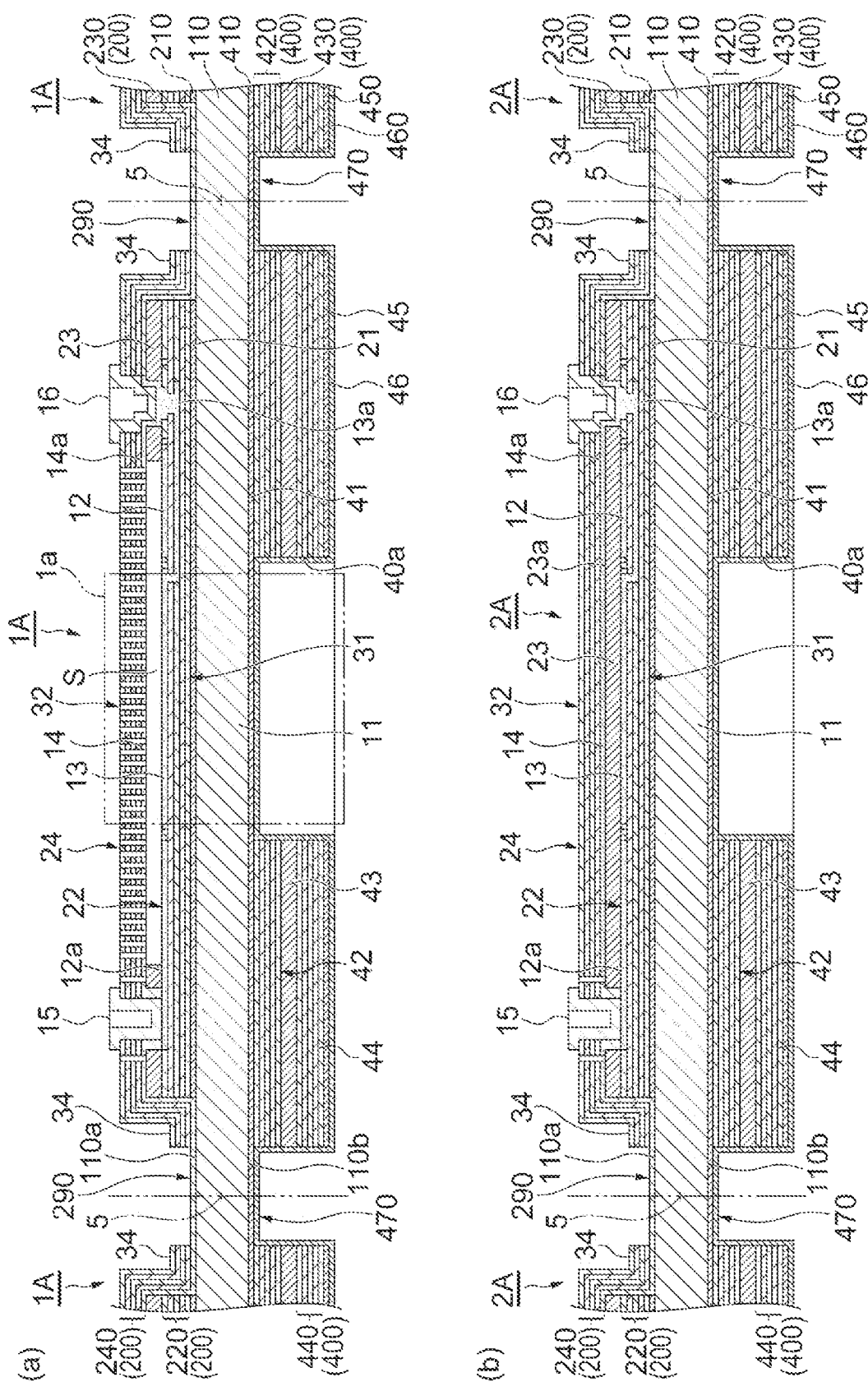
FIG. 7 is a cross-sectional view of a Fabry-Perot interference filter portion and a dummy filter portion of the wafer illustrated in FIG. 5.

(a) of FIG. 7 is a cross-sectional view of the Fabry-Perot interference filter portion 1A. (b) of FIG. 7 is a cross-sectional view of the dummy filter portion 2A. As illustrated in (a) and (b) of FIG. 7, the substrate layer 110 is a layer that is to be a plurality of substrates 11 when the wafer 100 is cut along each of the lines 5. The substrate layer 110 has a first surface 110a and a second surface 110b opposite to the first surface 110a. A reflection prevention layer 210 is provided on the first surface 110a of the substrate layer 110. The reflection prevention layer 210 is a layer to be a plurality of reflection prevention layers 21 when the wafer 100 is cut along each of the lines 5. A reflection prevention layer 410 is provided on the second surface 110b of the substrate layer 110. The reflection prevention layer 410 is a layer to be a plurality of antireflection layers 41 when the wafer 100 is cut along each of the lines 5.

A device layer 200 is provided on the reflection prevention layer 210. The device layer 200 includes a first mirror layer 220, an intermediate layer 230, and a second mirror layer 240. The first mirror layer 220 is a layer having a plurality of first mirror portions 31, and is a layer to be a plurality of first laminates 22 when the wafer 100 is cut along each of the lines 5. The plurality of first mirror portions 31 is two-dimensionally arranged on the first surface 110a of the substrate layer 110 via the reflection prevention layer 210. The intermediate layer 230 is a layer to be a plurality of intermediate layers 23 when the wafer 100 is cut along each of the lines 5. The second mirror layer 240 is a layer having a plurality of second mirror portions 32, and is a layer to be a plurality of second laminates 24 when the wafer 100 is cut along each of the lines 5. The plurality of second mirror portions 32 is two-dimensionally arranged on the first mirror layer 220 via the intermediate layer 23.

A stress adjustment layer 400 is provided on the reflection prevention layer 410. That is, the stress adjustment layer 400 is provided on the second surface 110b of the substrate layer 110 via the reflection prevention layer 410. The stress adjustment layer 400 includes a plurality of layers 420, 430, and 440. The layer 420 is a layer that is to be a plurality of third laminates 42 when the wafer 100 is cut along each of the lines 5. The layer 430 is a layer to be a plurality of intermediate layers 43 when the wafer 100 is cut along each of the lines 5. The layer 440 is a layer to be a plurality of fourth laminates 44 when the wafer 100 is cut along each of the lines 5.

A light shielding layer 450 and a protective layer 460 are provided on the stress adjustment layer 400. The light shielding layer 450 is a layer that is to be a plurality of light shielding layers 45 when the wafer 100 is cut along each of the lines 5. The protective layer 460 is a layer that is to be a plurality of protective layers 46 when the wafer 100 is cut along each of the lines 5.

As illustrated in (a) of FIG. 7, each of the Fabry-Perot interference filter portions 1A has a gap S formed between the first mirror portion 31 and the second mirror portion 32 facing each other. That is, in each of the Fabry-Perot interference filter portions 1A, the intermediate layer 23 defines the gap S, and the second mirror portion 32 floats on the gap S. Similarly to the configuration of the Fabry-Perot interference filter 1 described above, each of the Fabry-Perot interference filter portions 1A includes a configuration related to the first electrode 12, the second electrode 13, the third electrode 14, the plurality of terminals 15 and 16, the opening 40a, and the like. Therefore, even when the plurality of Fabry-Perot interference filter portions 1A is still in the state of the wafer 100, applying a voltage to each of the Fabry-Perot interference filter portions 1A via the pair of terminals 15 and 16 would change the distance between the first mirror portion 31 and the second mirror portion 32 facing each other due to the electrostatic force.

As illustrated in (b) of FIG. 7, each of the dummy filter portions 2A includes the intermediate layer 23 provided between the first mirror portion 31 and the second mirror portion 32 facing each other. That is, in the dummy filter portion 2A, the intermediate layer 23 does not define the gap S, and the second mirror portion 32 is disposed on the surface 23a of the intermediate layer 23. Accordingly, although each of the dummy filter portions 2A has a configuration related to the first electrode 12, the second electrode 13, the third electrode 14, the plurality of terminals 15 and 16, the openings 40a, and the like, similarly to the configuration of the dummy filter 2 described above, the distance between the first mirror portion 31 and the second mirror portion 32 facing each other would not change. Note that each of the dummy filter portions 2A does not need to include the configuration related to the first electrode 12, the second electrode 13, the third electrode 14, the plurality of terminals 15 and 16 (a metal film such as aluminum to form each of the terminal 15 and 16, through-holes for disposing each of the terminals 15 and 16, and the like), the opening 40a, and the like.

As illustrated in FIG. 6 and (a) of FIG. 7, the device layer 200 has a first groove 290 opening on the side opposite to the substrate layer 110. The first groove 290 is formed along each of the lines 5. The first groove 290 surrounds the first mirror portion 31, the intermediate layer 23, and the second mirror portion 32 in each of the Fabry-Perot interference filter portions 1A and each of the dummy filter portions 2A. In each of the Fabry-Perot interference filter portions 1A, the first mirror portion 31, the intermediate layer 23, and the second mirror portion 32 are surrounded by the annularly continuous first groove 290. Similarly, in each of the dummy filter portions 2A, the first mirror portion 31, the intermediate layer 23, and the second mirror portion 32 are surrounded by the annularly continuous first groove 290. Focusing on the adjacent filter portions 1A-1A, the adjacent filter portions 1A-2A, and the adjacent filter portions 2A-2A, the first groove 290 corresponds to a region on a peripheral edge portion 34 of one filter portion and a peripheral edge portion 34 of the other filter portion. The first groove 290 is continuous through the effective area 101 and the dummy area 102, and reaches the outer edge 110c of the substrate layer 110 when viewed in a direction in which the first mirror portion 31 and the second mirror portion 32 face each other (hereinafter, simply referred to as a "facing direction"). It is sufficient as long as the first groove 290 surrounds at least the second mirror portion 32 in each of the Fabry-Perot interference filter portions 1A and each of the dummy filter portions 2A. In this case, the second mirror portion 32 in the facing direction does not need to be surrounded, as a whole, by the first groove 290. It is sufficient as long as at least a portion of the second mirror portion 32 in the facing direction is surrounded by the first groove 290.

As illustrated in (b) of FIG. 7, the stress adjustment layer 400 has a second groove 470 opening on the opposite side of the substrate layer 110. The second groove 470 is formed along each of the lines 5. That is, the second groove 470 is formed so as to correspond to the first groove 290. Here, formation of the second groove 470 corresponding to the first groove 290 means that the second groove 470 overlaps the first groove 290 when viewed in the facing direction. Therefore, the second groove 470 is continuous in the effective area 101 and the dummy area 102 and reaches the outer edge 110c of the substrate layer 110 when viewed in the facing direction.

[Method of Manufacturing Wafer]

Next, a method of manufacturing the wafer 100 will be described with reference to FIGS. 8 to 13. In FIGS. 8 to 13, (a) is cross-sectional view of a portion corresponding to the Fabry-Perot interference filter portion 1A, and (b) is a cross-sectional view of a portion corresponding to the dummy filter portion 2A.

Figure 8:
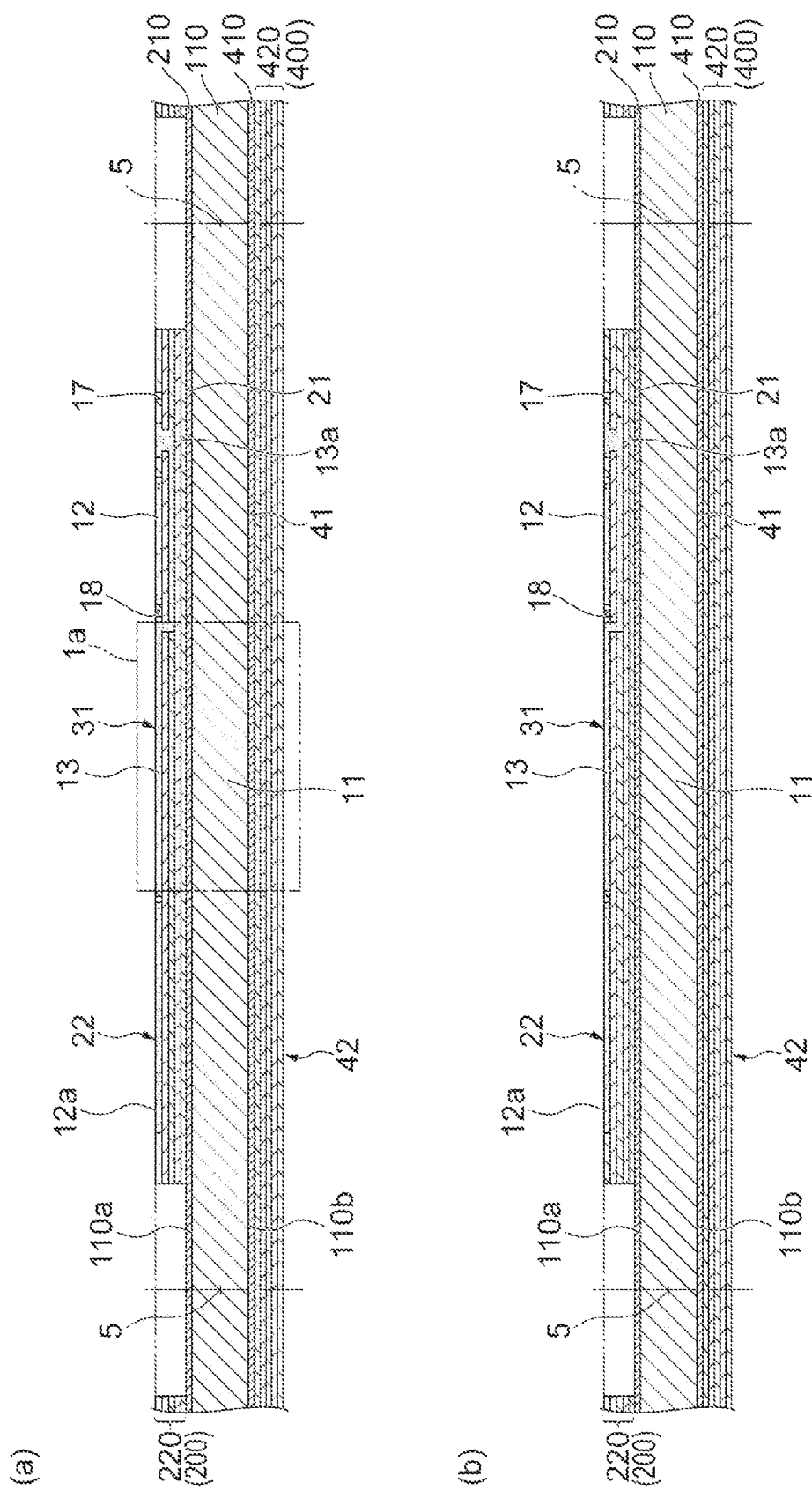
FIG. 8 is a cross-sectional view illustrating a method for manufacturing the wafer illustrated in FIG. 5.

First, as illustrated in FIG. 8, the reflection prevention layer 210 is formed on the first surface 110a of the substrate layer 110, while the reflection prevention layer 410 is formed on the second surface 110b of the substrate layer 110. Subsequently, a plurality of polysilicon layers and a plurality of silicon nitride layers are alternately laminated on each of the reflection prevention layers 210 and 410, so as to form the first mirror layer 220 on the reflection prevention layer 210 and form the layer 420 on the reflection prevention layer 410.

When the first mirror layer 220 is formed, etching is performed to remove a portion along each of the lines 5 in the first mirror layer 220 so as to expose the surface of the reflection prevention layer 210. In addition, by doping impurities to achieve low resistivity in a portion of a predetermined polysilicon layer in the first mirror layer 220, the first electrode 12, the second electrode 13, and the wiring 12a and 13a are formed in each of portions corresponding to the substrate 11. Moreover, etching is performed to form the trenches 17 and 18 on a surface of the first mirror layer 220 in each of portions corresponding to the substrate 11.

Figure 9:
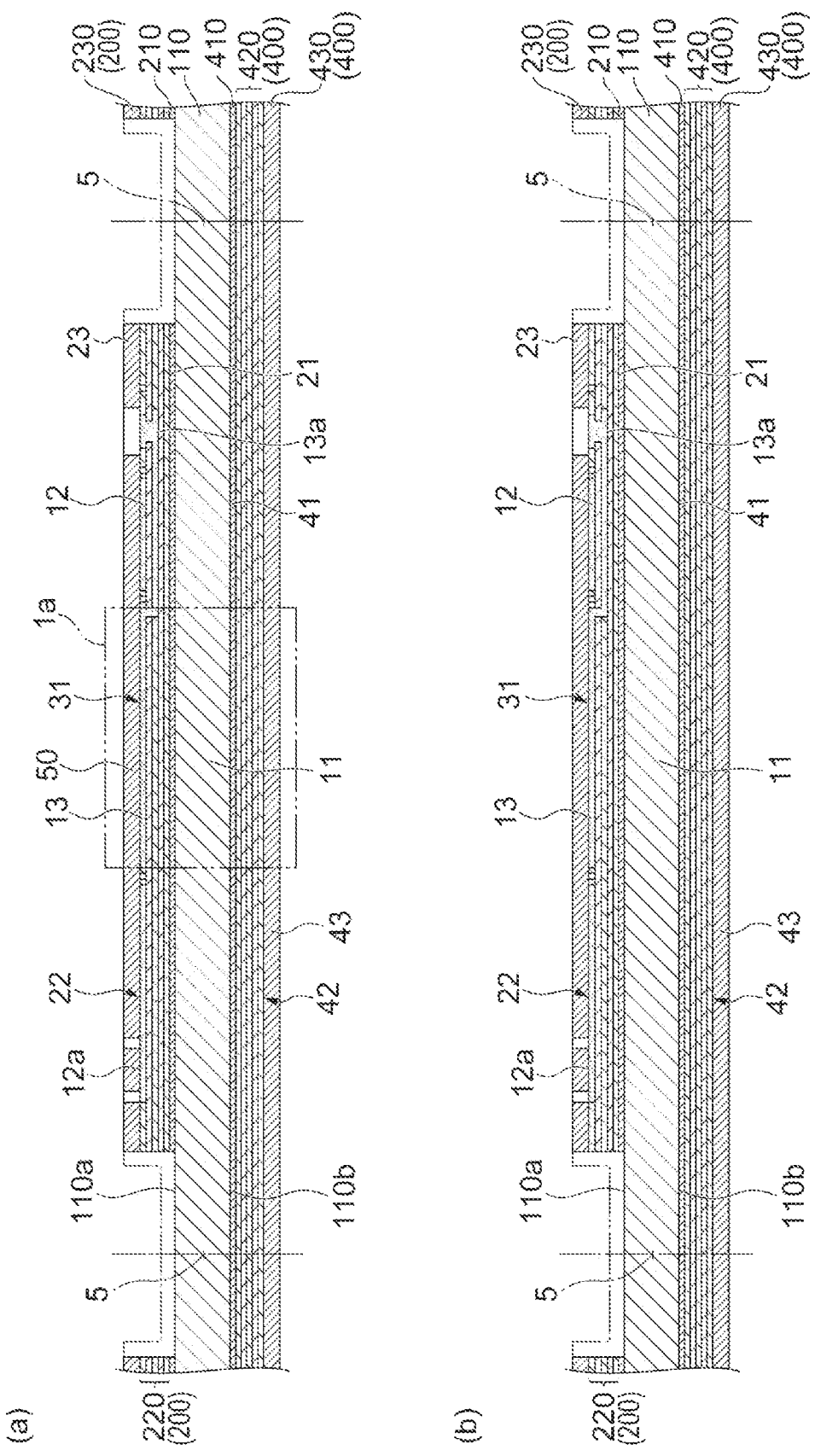
FIG. 9 is a cross-sectional view illustrating a method for manufacturing the wafer illustrated in FIG. 5.

Subsequently, as illustrated in FIG. 9, the intermediate layer 230 is formed on the first mirror layer 220 and on the exposed surface of the reflection prevention layer 210, and the layer 430 is formed on the layer 420. At a portion corresponding to each of the Fabry-Perot interference filter portions 1A, the intermediate layer 230 includes a portion 50 expected to be removed corresponding to the gap S (refer to FIG. 3). Subsequently, etching is performed to remove a portion along each of the lines 5 in the intermediate layer 230 and the reflection prevention layer 210 so as to expose the first surface 110a of the substrate layer 110. In addition, the etching is performed to form a gap at a portion corresponding to each of the terminals 15 and 16 (refer to FIG. 3) in the intermediate layer 230 for each of portions corresponding to the substrate 11.

Figure 10:
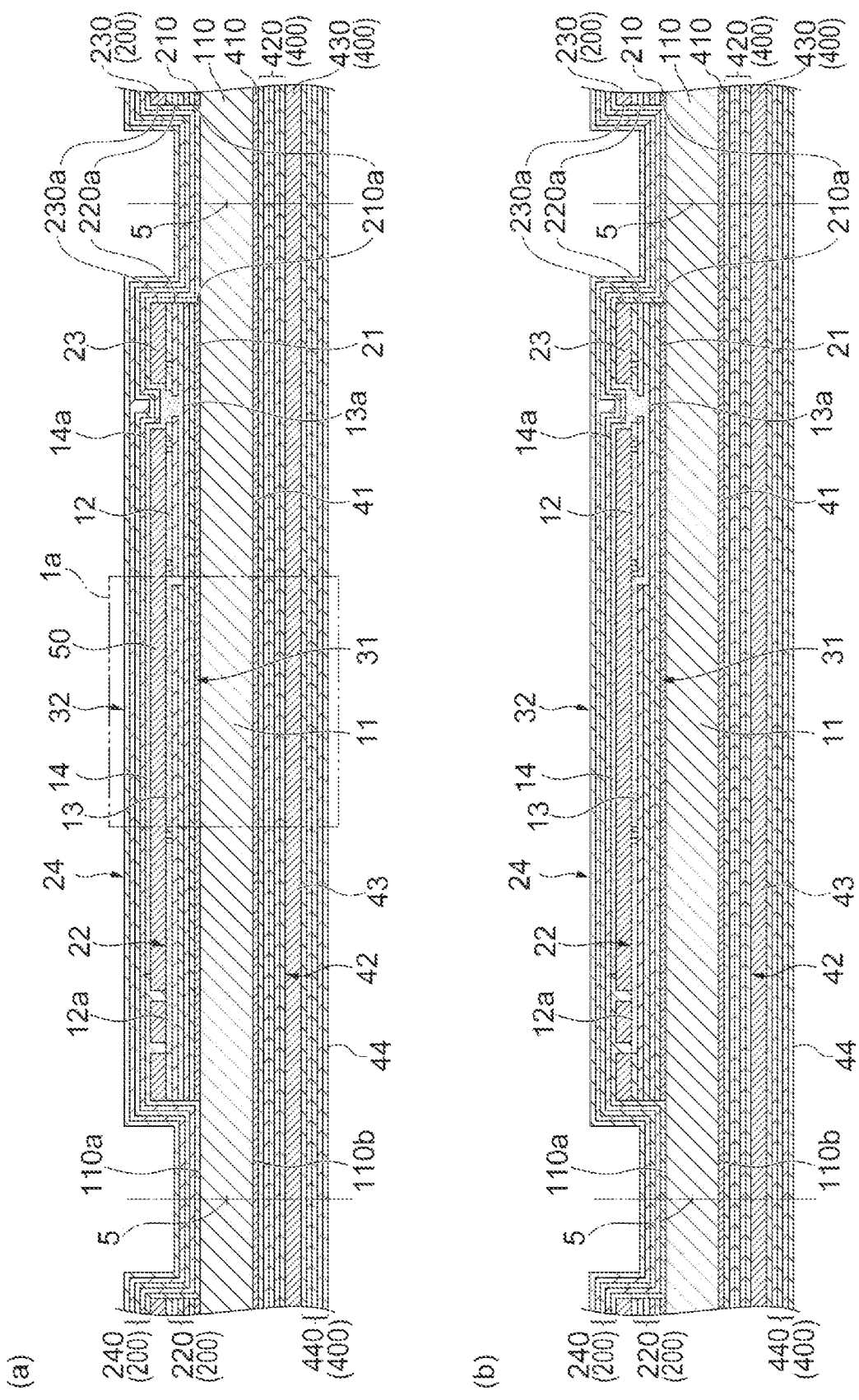
FIG. 10 is a cross-sectional view illustrating a method for manufacturing the wafer illustrated in FIG. 5.

Subsequently, as illustrated in FIG. 10, a plurality of polysilicon layers and a plurality of silicon nitride layers are alternately laminated on each of the first surface 110a side and the second surface 110b side of the substrate layer 110, thereby forming the second mirror layer 240 on the intermediate layer 230 and on the exposed first surface 110a of the substrate layer 110, as well as forming the layer 440 on the layer 430.

When the second mirror layer 240 is formed, side surfaces 230a of the intermediate layer 230, side surfaces 220a of the first mirror layer 220, and side surfaces 210a of the reflection prevention layer 210, facing each other along the line 5, are covered with the second mirror layer 240. In addition, by doping impurities to achieve low resistivity in a portion of a predetermined polysilicon layer in the second mirror layer 240, the third electrode 14 and the wiring 14a are formed in each of portions corresponding to the substrate 11.

Figure 11:
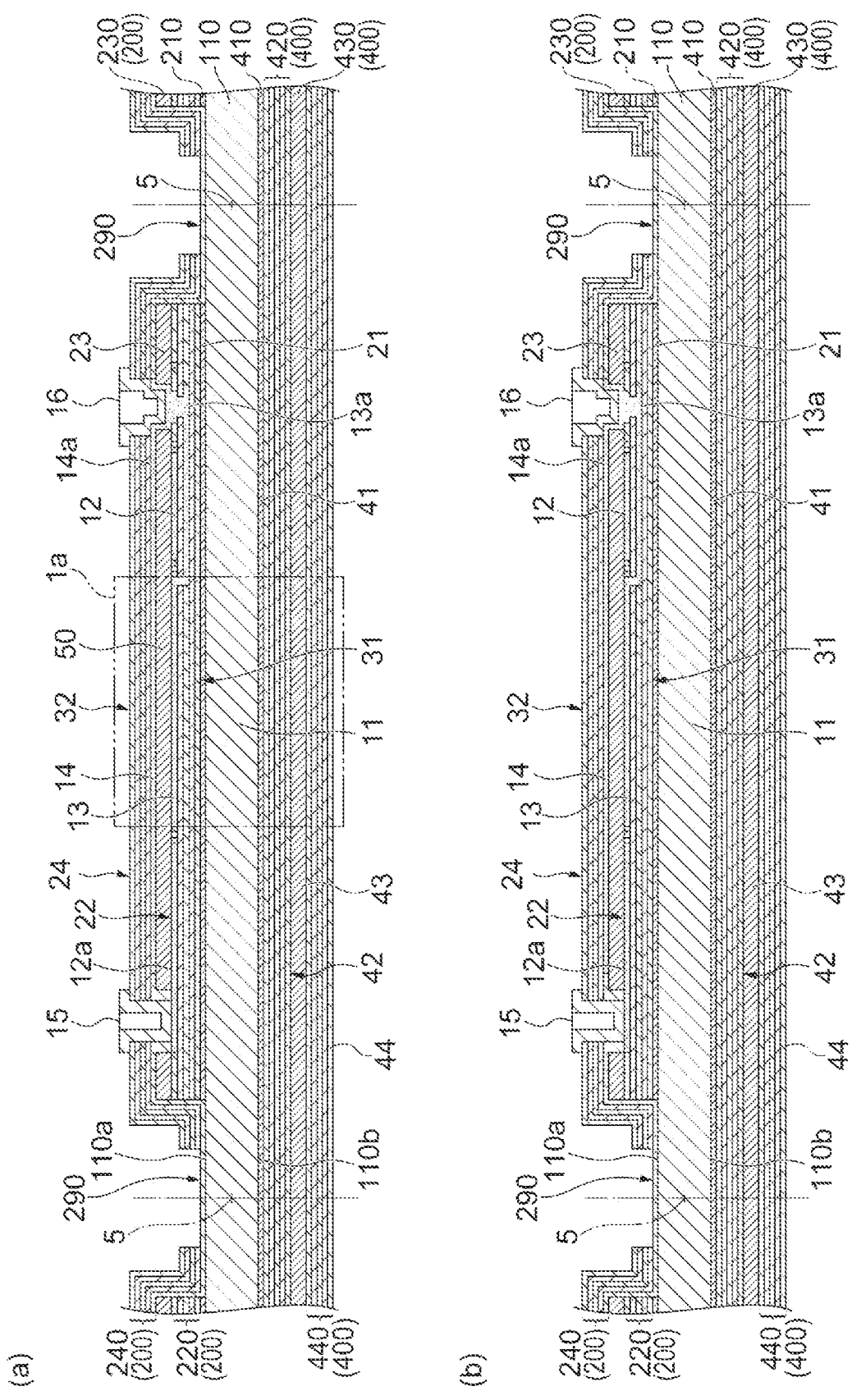
FIG. 11 is a cross-sectional view illustrating a method for manufacturing the wafer illustrated in FIG. 5.

Subsequently, as illustrated in FIG. 11, etching is performed to thin a portion along each of the lines 5 in the second mirror layer 240 so as to expose the surface of the polysilicon layer 27a (refer to FIG. 3) (that is, the polysilicon layer positioned closest to the first surface 110a side) included in the second mirror layer 240. In addition, the etching is performed to form a gap at a portion corresponding to each of the terminals 15 and 16 (refer to FIG. 3) in the second mirror layer 240 for each of portions corresponding to the substrate 11. Subsequently, the terminals 15 and 16 are formed in the gap for each of portions corresponding to the substrate 11, and the terminal 15 and the wiring 12a are connected to each other, while the terminal 16 and each of the wiring 13a and the wiring 14a are connected to each other.

With the procedure above, the reflection prevention layer 210 and the device layer 200 are formed on the first surface 110a of the substrate layer 110, while the first groove 290 is formed in the device layer 200. The first groove 290 is a region where the device layer 200 is partially thinned along each of the lines 5.

Figure 12:
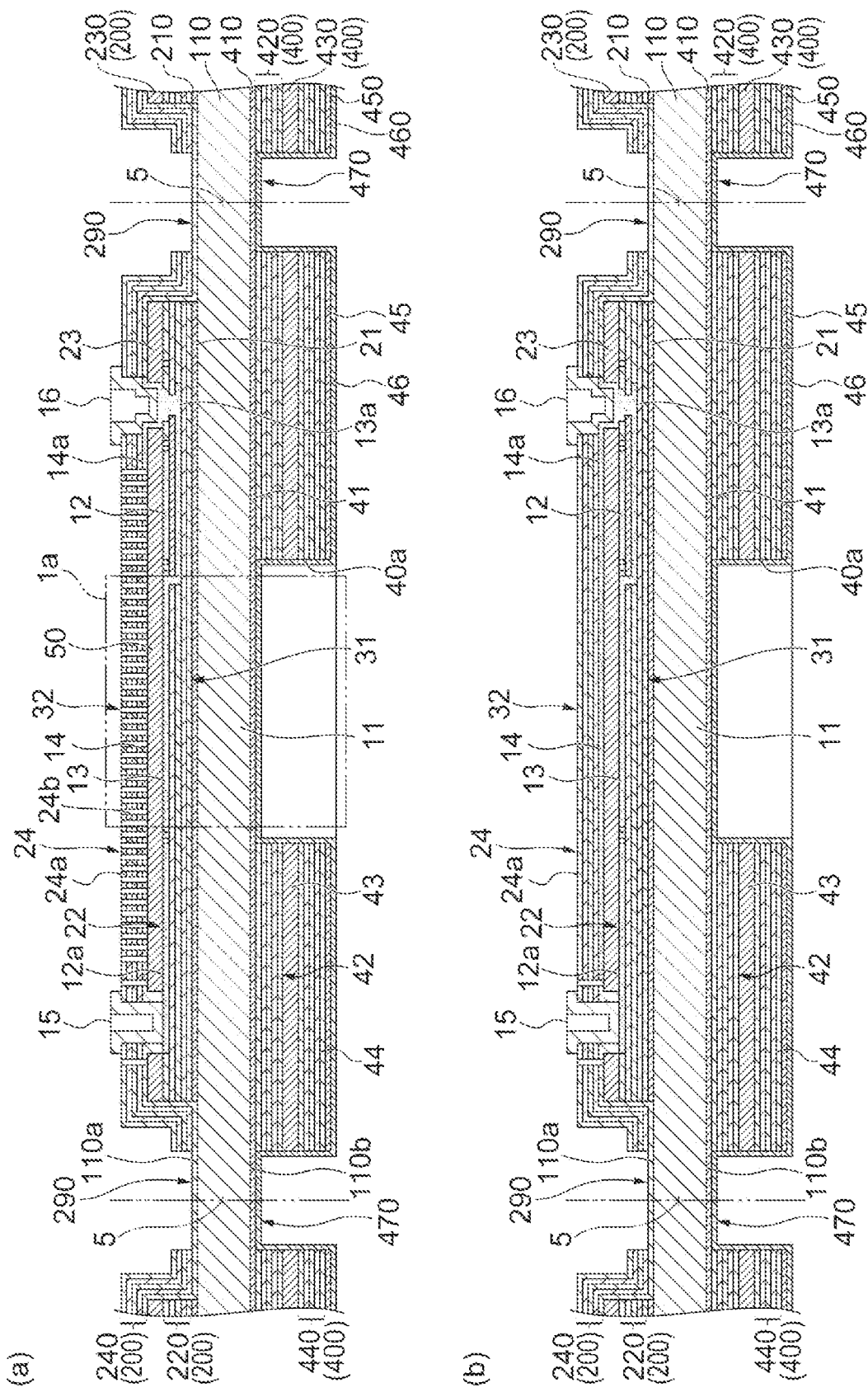
FIG. 12 is a cross-sectional view illustrating a method for manufacturing the wafer illustrated in FIG. 5.

Subsequently, as illustrated in (a) of FIG. 12, etching is performed in each of portions corresponding to the Fabry-Perot interference filter portion 1A so as to form, in the second laminate 24, the plurality of through-holes 24b from the surface 24a of the second laminate 24 to the portion 50 expected to be removed. At this time, as illustrated in (b) of FIG. 12, the plurality of through-holes 24b will not be formed in the second laminate 24 in a portion corresponding to each of the dummy filter portions 2A. Subsequently, as illustrated in FIG. 12, the light shielding layer 450 is formed on the layer 440. Subsequently, etching is performed to remove a portion along each of the lines 5 in the light shielding layer 450 and the stress adjustment layer 400 (that is, the layers 420, 430, and 440) so as to expose the surface of the reflection prevention layer 410. In addition, the etching is performed to form the opening 40a in each of portions corresponding to the substrate 11. Subsequently, the protective layer 460 is formed on the light shielding layer 450, the exposed surface of the reflection prevention layer 410, an inner surface of the opening 40a, and the side surface of the stress adjustment layer 400 facing the second groove 470.

With the procedure above, the reflection prevention layer 410, the stress adjustment layer 400, the light shielding layer 450, and the protective layer 460 are formed on the second surface 110b of the substrate layer 110, while the second groove 470 is formed in the stress adjustment layer 400. The second groove 470 is a region in which the stress adjustment layer 400 is partially thinned along each of the lines 5.

Figure 13:
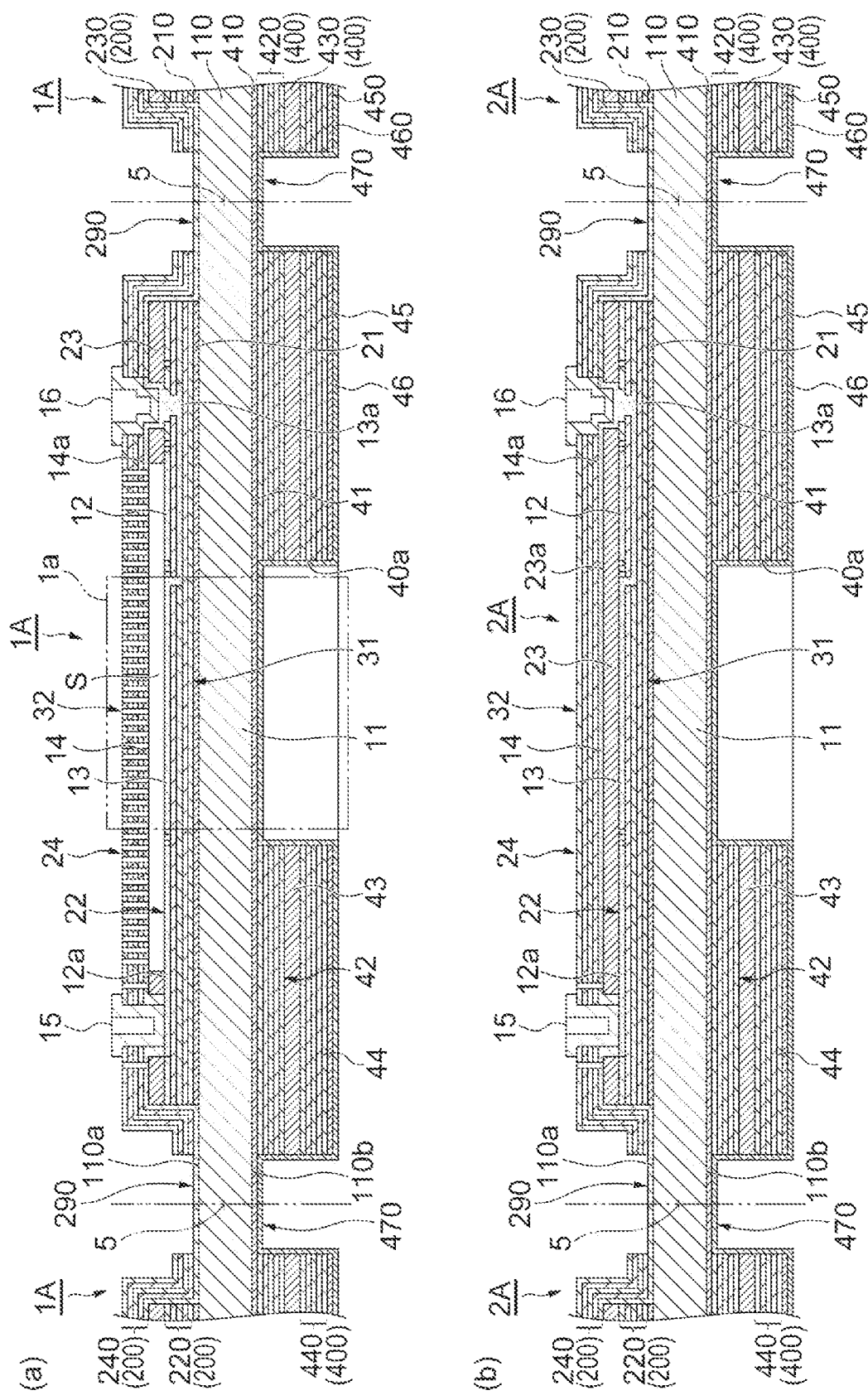
FIG. 13 is a cross-sectional view illustrating a method for manufacturing the wafer illustrated in FIG. 5.

Subsequently, as illustrated in (a) of FIG. 13, etching via a plurality of through-holes 24b (for example, gas phase etching using hydrofluoric acid gas) is performed at a portion corresponding to each of the Fabry-Perot interference filter portions 1A to collectively remove the plurality of portions 50 expected to be removed from the intermediate layer 230. With this procedure, a gap S is formed in the portion corresponding to each of the Fabry-Perot interference filter portions 1A for each of portion corresponding to the substrate 11. At this time, as illustrated in (b) of FIG. 13, since the plurality of through-holes 24b is not formed in the second laminate 24 at the portion corresponding to each of the dummy filter portions 2A, the gap S will not be formed in the intermediate layer 230.

With the procedure described above, as illustrated in (a) of FIG. 7, the gap S is formed between the first mirror portion 31 and the second mirror portion 32 facing each other in the effective area 101, thereby forming the plurality of Fabry-Perot interference filter portions 1A. In contrast, in the dummy area 102, the intermediate layer 23 is provided between the first mirror portion 31 and the second mirror portion 32 facing each other as illustrated in (b) of FIG. 7, thereby forming the plurality of dummy filter portion 2A.

[Method of Manufacturing Fabry-Perot Interference Filter]

Figure 14:
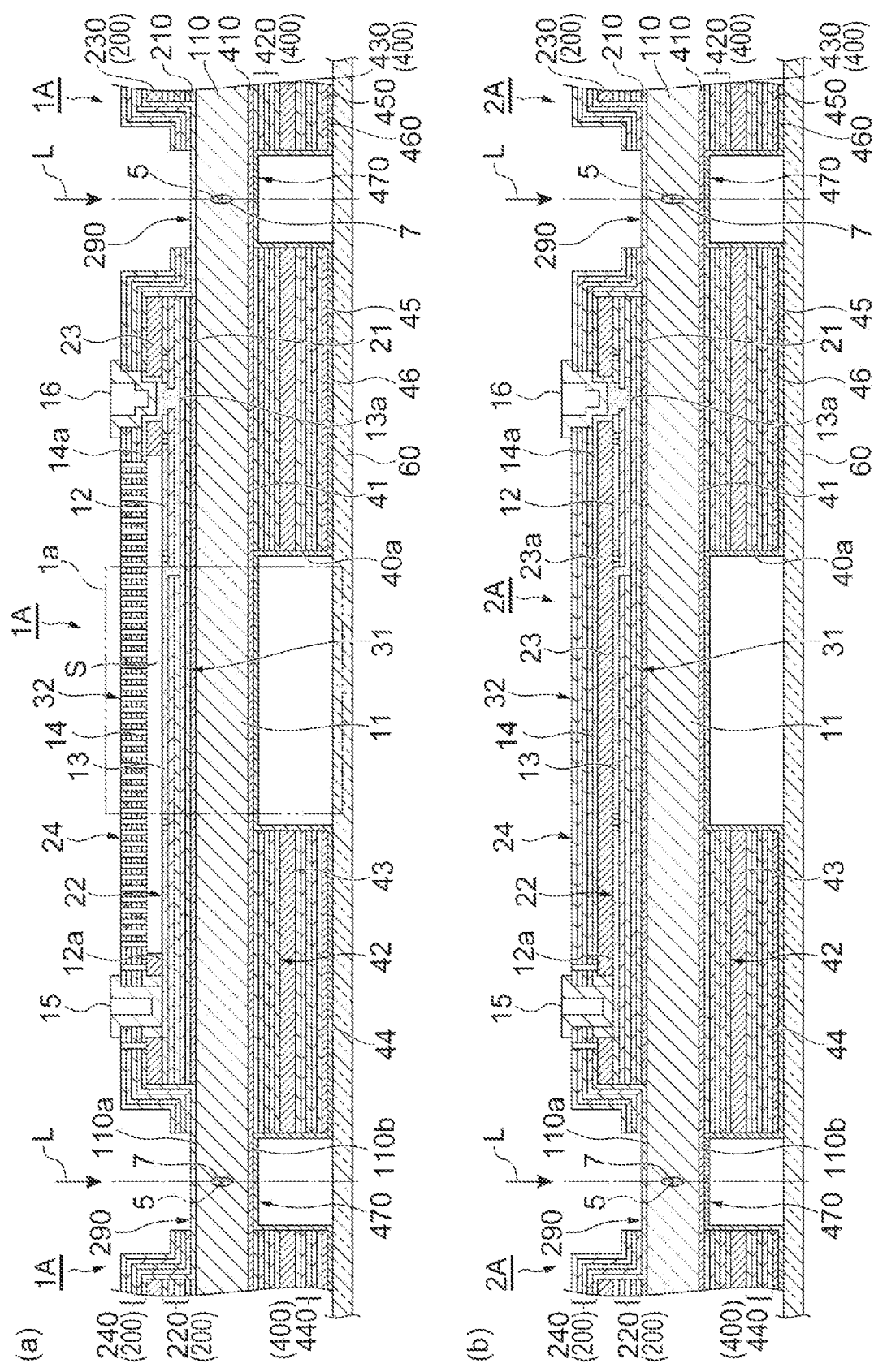
FIG. 14 is a cross-sectional view illustrating a method for cutting out a Fabry-Perot interference filter from the wafer illustrated in FIG. 5.
Figure 15:
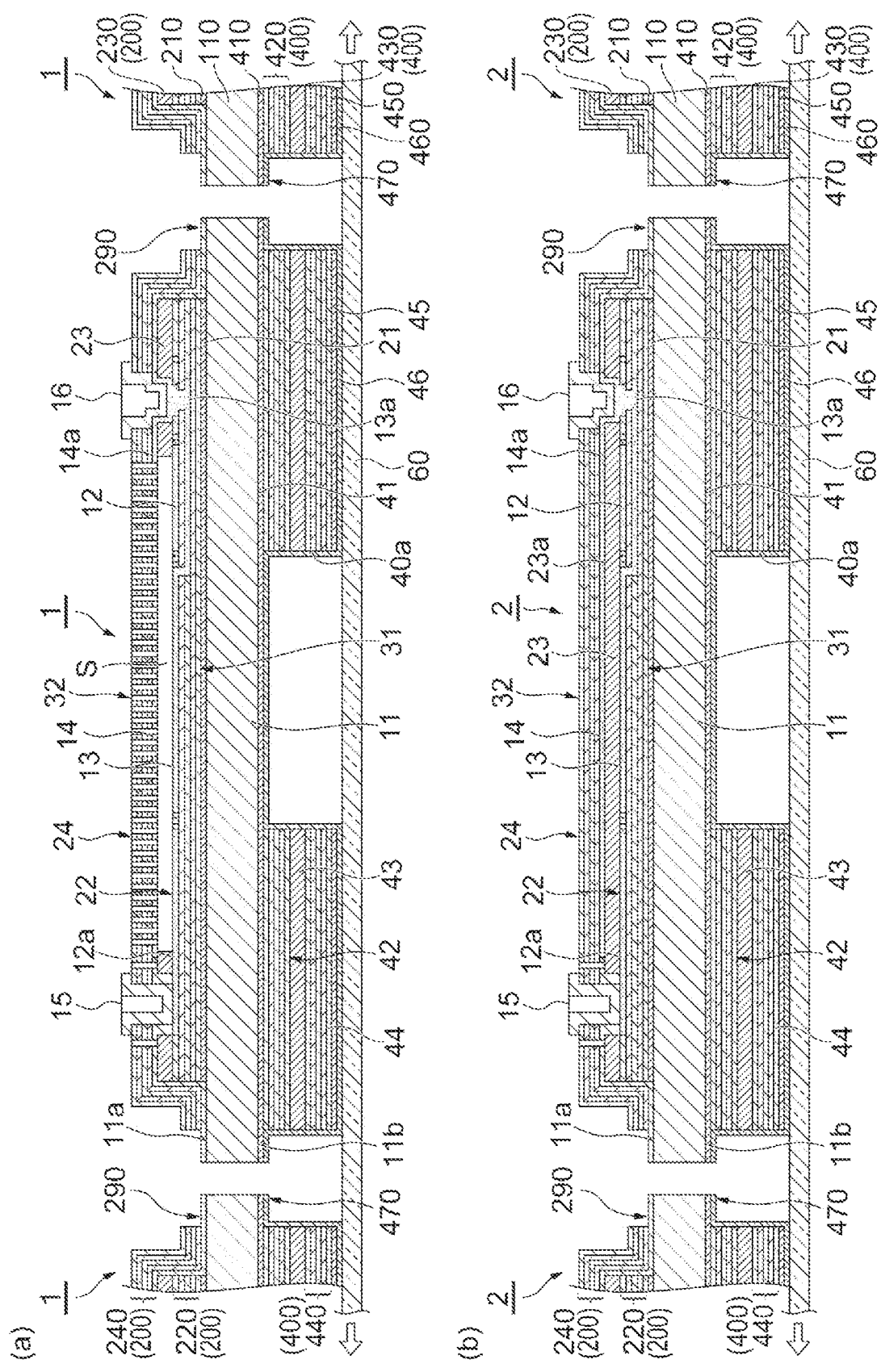
FIG. 15 is a cross-sectional view illustrating a method for cutting out a Fabry-Perot interference filter from the wafer illustrated in FIG. 5.

Next, a method for cutting out the Fabry-Perot interference filter 1 from the wafer 100 (a method of manufacturing the Fabry-Perot interference filter 1) will be described with reference to FIGS. 14 and 15. In FIGS. 14 and 15, (a) is a cross-sectional view of a portion corresponding to the Fabry-Perot interference filter portion 1A, and (b) is a cross-sectional view of a portion corresponding to the dummy filter portion 2A.

First, as illustrated in FIG. 14, an expanding tape 60 is attached onto the protective layer 460 (that is, to the second surface 110b side). Subsequently, laser light L is applied from a side opposite to the expanding tape 60 in a state where the expanding tape 60 is attached to the second surface 110b side, and then a converging point of the laser light L is relatively moved along each of the lines 5 while the converging point of the laser light L is positioned within the substrate layer 110. That is, the laser light L is controlled to be incident on the substrate layer 110 from the side opposite to the expanding tape 60 through the surface of the polysilicon layer exposed in the first groove 290.

With the irradiation of the laser light L, a modified region 7 is formed within the substrate layer 110 along each of the lines 5. The modified region 7 is a region having physical characteristics such as density, a refractive index, mechanical strength different from those in the surrounding area, and is a region to be a start point of a fracture extending in a thickness direction of the substrate layer 110. Examples of the modified region 7 include molten processed regions (which means at least any one of a region resolidified after melting, a region in a melted state, and a region in a state of being resolidified from the melted state), a crack region, a dielectric breakdown region, a refractive index changed region, or the like, or a mixed region of these. Further examples of the modified region 7 include a region where the density of the modified region 7 has changed from that of an unmodified region, a region with a lattice defect, or the like, in the material of the substrate layer 110. When the material of the substrate layer 110 is monocrystalline silicon, the modified region 7 can also be defined as a high-dislocation density region. The number of rows of the modified regions 7 arranged in the thickness direction of the substrate layer 110 with respect to each of the lines 5 is appropriately adjusted based on the thickness of the substrate layer 110.

Subsequently, as illustrated in FIG. 15, the expanding tape 60 attached to the second surface 110b side is expanded so as to extend the fracture in the thickness direction of the substrate layer 110 from the modified region 7 formed within the substrate layer 110, and then, the substrate layer 110 is cut into the plurality of substrates 11 along each of the lines 5. At this time, the polysilicon layer of the second mirror layer 240 is cut along each of the lines 5 in the first groove 290, while the reflection prevention layer 410 and the protective layer 460 are cut along each of the lines 5 in the second groove 470. With this procedure, a plurality of Fabry-Perot interference filters 1 and the plurality of dummy filters 2 in a state of being separated from each other on the expanding tape 60 are obtained.

[Configuration of Light Detection Device]

Figure 16:
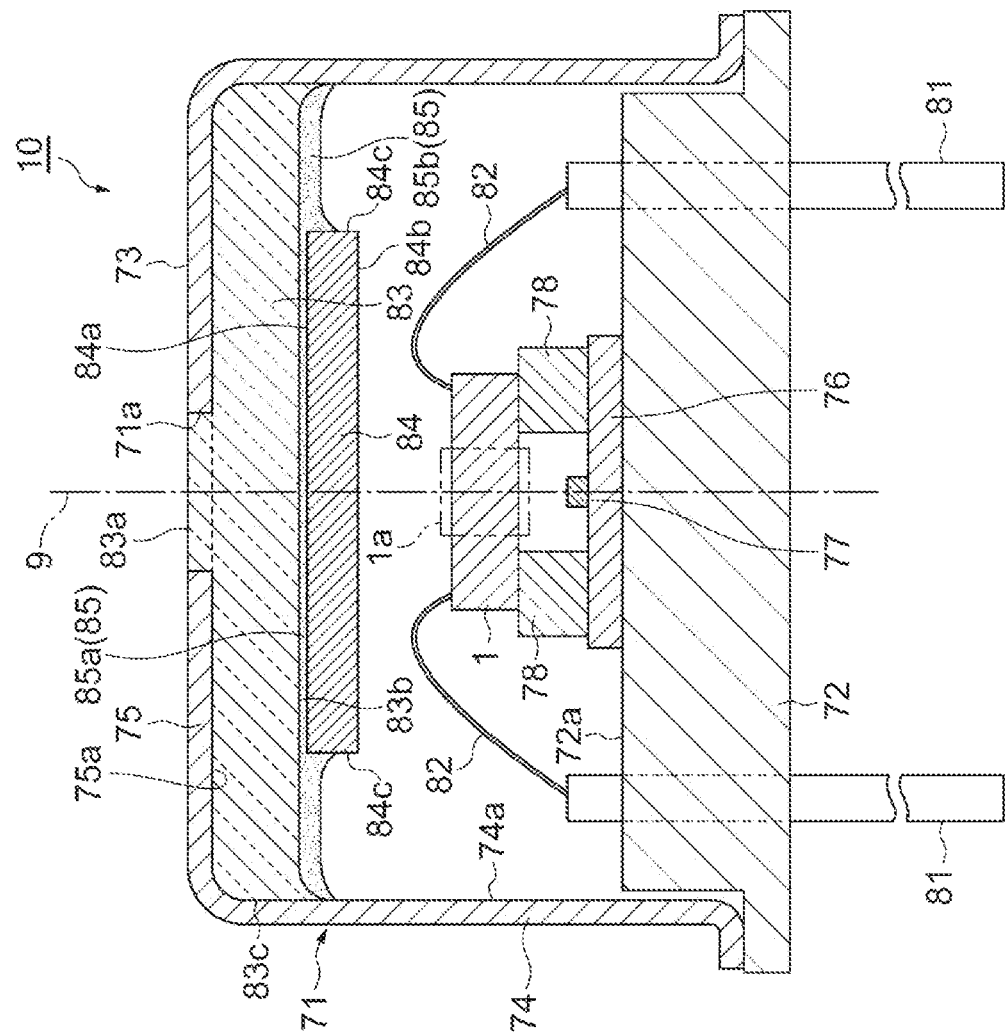
FIG. 16 is a cross-sectional view of a light detection device including a Fabry-Perot interference filter.

Next, a configuration of the light detection device 10 including the Fabry-Perot interference filter 1 will be described. As illustrated in FIG. 16, the light detection device 10 includes a package 71. The package 71 is a CAN package including a stem 72 and a cap 73. The cap 73 is integrally formed by a side wall 74 and a top wall 75. The stem 72 and the cap 73 are formed of a metal material and are hermetically joined to each other. In the package 71 formed of a metal material, the shape of the side wall 74 is cylindrical about a line 9 as a center line. The stem 72 and the top wall 75 face each other in a direction parallel to the line 9, and close both ends of the side wall 74, individually.

A wiring substrate 76 is secured to an inner surface 72a of the stem 72. Examples of a material applicable as the wiring substrate 76 include silicon, ceramic, quartz, glass, plastic, or the like. The light detector (light detection unit) 77 and a temperature detector (not illustrated) such as a thermistor are mounted on the wiring substrate 76. The light detector 77 is disposed on the line 9. More specifically, the light detector 77 is disposed such that the center line of a light receiving portion thereof is aligned with the line 9. The light detector 77 is an infrared detector such as a quantum type sensor using InGaAs or other compounds or a thermal type sensor using a thermopile or a bolometer or the like. In a case of detecting light of different wavelength bands of ultraviolet, visible, and near infrared regions, for example a silicon photodiode or the like can be used as the light detector 77. Note that the light detector 77 may include one light receiving portion, or a plurality of light receiving portions provided in an array. Furthermore, a plurality of light detectors 77 may be mounted on the wiring substrate 76. The temperature detector may be disposed at a position close to the Fabry-Perot interference filter 1, for example, so that a temperature change of the Fabry-Perot interference filter 1 can be detected.

A plurality of spacers 78 is secured onto the wiring substrate 76. Examples of a material applicable as the spacers 78 include silicon, ceramic, quartz, glass, plastic, or the like. The Fabry-Perot interference filter 1 is secured onto the plurality of spacers 78 by adhesive, for example. Fabry-Perot interference filter 1 is disposed on the line 9. More specifically, the Fabry-Perot interference filter 1 is disposed such that the center line of the light transmission region 1a is aligned with the line 9. Note that the spacers 78 may be integrally formed with the wiring substrate 76. The Fabry-Perot interference filter 1 may be supported by a single spacer 78, rather than by the plurality of spacers 78.

A plurality of lead pins 81 is secured to the stem 72. More specifically, each of the lead pins 81 penetrates through the stem 72 in a state where electrical insulation and hermeticity with the stem 72 are maintained. Each of the lead pins 81 is electrically connected by wires 82 to each of electrode pads provided on the wiring substrate 76, a terminal of the light detector 77, a terminal of the temperature detector, and a terminal of the Fabry-Perot interference filter 1. The light detector 77, the temperature detector, and the Fabry-Perot interference filter 1 may be electrically connected to each of the lead pin 81 via the wiring substrate 76. For example, each of terminals may be electrically connected to an electrode pad provided on the wiring substrate 76, while the electrode pad and each of the lead pins 81 may be connected by the wire 82. This enables input and output of electric signals to and from each of the light detector 77, the temperature detector, and the Fabry-Perot interference filter 1.

The package 71 has an opening 71a. More specifically, the opening 71a is formed in the top wall 75 of the cap 73 such that the center line thereof is aligned with the line 9. The shape of the opening 71a is circular when viewed in a direction parallel to the line 9. A light transmitting member 83 is disposed on an inner surface 75a of the top wall 75 so as to close the opening 71a. The light transmitting member 83 is hermetically joined to the inner surface 75a of the top wall 75. The light transmitting member 83 has a light incident surface 83a and a light emission surface 83b (inner surface) opposite to the light incident surface 83a in a direction parallel to line 9, and has side surfaces 83c. The light incident surface 83a of the light transmitting member 83 is substantially flush with an outer surface of the top wall 75 at the opening 71a. The side surface 83c of the light transmitting member 83 is in contact with an inner surface 74a of the side wall 74 of the package 71. That is, the light transmitting member 83 reaches the inside of the opening 71a and the inner surface 74a of the side wall 74. Such a light transmitting member 83 is formed by disposing a glass pellet inside the cap 73 with the opening 71a facing down and melting the glass pellet. That is, the light transmitting member 83 is formed of fused glass.

A band pass filter 84 is secured to the light emission surface 83b of the light transmitting member 83 by a bonding member 85. That is, the bonding member 85 secures the band pass filter 84 to the inner surface 75a of the top wall 75 via the light transmitting member 83 joined to the inner surface 75a of the top wall 75. The band pass filter 84 selectively transmits light with a measurement wavelength range by the light detection device 10 (light with a predetermined wavelength range and should be incident on the light transmission region 1a of the Fabry-Perot interference filter 1) out of light transmitted through the light transmitting member 83 (that is, the band pass filter 84 transmits only the light with the wavelength range). The band pass filter 84 has a rectangular plate shape. More specifically, the band pass filter 84 has a light incident surface 84a and a light emission surface 84b opposite to the light incident surface 84a in a direction parallel to the line 9, and has four side surfaces 84c. The band pass filter 84 is obtained by forming a dielectric multilayer film (for example, a multilayer film combining a high refractive material such as $TiO_2$, $Ta_2O_5$, or the like and a low refractive material such as $SiO_2$, $MgF_2$, or the like) on a surface of a light transmitting member formed in a rectangular shape using a light transmitting material (for example, silicon, glass, or the like).

The bonding member 85 includes a first portion 85a arranged over the entire region of the light incident surface 84a of the band pass filter 84. That is, the first portion 85a in the bonding member 85 is a portion arranged between the light emission surface 83b of the light transmitting member 83 and the light incident surface 84a of the band pass filter 84 facing each other. The bonding member 85 further includes a second portion 85b protruding outward from the outer edge of the band pass filter 84 when viewed in a direction parallel to the line 9. The second portion 85b reaches the inner surface 74a of the side wall 74 and is in contact with the inner surface 74a of the side wall 74. Furthermore, the second portion 85b is in contact with the side surface 84c of the band pass filter 84.

In the light detection device 10 configured as described above, when light is incident on the band pass filter 84 from outside via the opening 71a, the light transmitting member 83, and the bonding member 85, light with a predetermined wavelength range is selectively transmitted. When the light transmitted through the band pass filter 84 is incident on the light transmission region 1a of the Fabry-Perot interference filter 1, light with a predetermined wavelength out of the light with the predetermined wavelength range is selectively transmitted. The light transmitted by the light transmission region 1a of the Fabry-Perot interference filter 1 is incident on the light receiving portion of the light detector 77 and is detected by the light detector 77. That is, the light detector 77 converts the light transmitted through the Fabry-Perot interference filter 1 into an electric signal and outputs the electric signal. For example, the light detector 77 outputs an electric signal of a strength corresponding to the intensity of the light incident on the light receiving portion.

[Action and Effect by Wafer]

The wafer 100 enables acquisition of a plurality of Fabry-Perot interference filters 1 with high efficiency and high yield as described below.

In the wafer 100, the plurality of Fabry-Perot interference filter portions 1A to be the plurality of Fabry-Perot interference filters 1 is provided in the effective area 101. In addition, the plurality of dummy filter portions 2A is provided in the dummy area 102 desposed along the outer edge 110c of the substrate layer 110 and surrounding the effective area 101, and the intermediate layer 23 is provided between the first mirror portion 31 and the second mirror portion 32 facing each other in each of the dummy filter portions 2A. This configuration sufficiently ensures the strength of the entire wafer 100. This facilitates handling of the wafer 100 when cutting out a plurality of Fabry-Perot interference filters 1 from the wafer 100, for example. Furthermore, each of the Fabry-Perot interference filter portions 1A operates similarly to the Fabry-Perot interference filter 1 even when the plurality of Fabry-Perot interference filter portions 1A is still in the state of the wafer 100. Accordingly, it is possible to inspect various characteristics of each of the Fabry-Perot interference filter portions 1A in this state, with improved easiness of handling of the wafer 100 during execution of such an inspection. The presence of the gap S formed between the first mirror portion 31 and the second mirror portion 32 facing each other in each of the dummy filter portions 2A would lead to a case, for example, where the second mirror portion 32 is damaged when the dummy area 102 of the wafer 100 is gripped by a gripper tool and fragments of the second mirror portion 32 would adhere to the Fabry-Perot interference filter portion 1A to degrade the appearance and characteristics of the Fabry-Perot interference filter portion 1A. Occurrence of such a situation is suppressed in this wafer 100 because it includes the intermediate layer 23 provided between the first mirror portion 31 and the second mirror portion 32 facing each other in each of the dummy filter portions 2A.

In the wafer 100, at least the second mirror portion 32 is surrounded by the first groove 290 in each of the Fabry-Perot interference filter portions 1A. This improves the yield in cutting out the plurality of Fabry-Perot interference filters 1 from the wafer 100. In a case where at least the second mirror portion 32 is not surrounded by the first groove 290 in each of the Fabry-Perot interference filter portions 1A, peeling, chipping, or the like are likely to occur at a cutting surface of the device layer 200 when the plurality of Fabry-Perot interference filters 1 is cut out from the wafer 100, and this might cause degradation of the appearance, characteristics, or the like in the Fabry-Perot interference filter portion 1A.

In the wafer 100, at least the second mirror portion 32 is surrounded by the first groove 290 in each of the dummy filter portions 2A. In a case where at least the second mirror portion 32 is not surrounded by the first groove 290 in each of the dummy filter portions 2A, no gap is formed between the first mirror portion 31 and the second mirror portion 32, which would lead to accumulation of stress in the dummy filter portion 2A and might cause warpage of the wafer 100. In the wafer 100, since at least the second mirror portion 32 is surrounded by the first groove 290 in each of the dummy filter portions 2A, the stress is reduced in the dummy area 102, and the warpage of the wafer 100 is suppressed. In a case where at least the second mirror portion 32 is not surrounded by the first groove 290 in each of the dummy filter portions 2A, peeling, chipping, or the like are likely to occur at a cutting surface of the device layer 200 when the plurality of dummy filters 2 is cut out from the wafer 100, resulting in adhesion of fragments to the Fabry-Perot interference filter 1, which might cause degradation of the appearance, characteristics, or the like in the Fabry-Perot interference filter 1. Occurrence of such a situation is suppressed in the wafer 100 because at least the second mirror portion 32 is surrounded by the first groove 290 in each of the dummy filter portions 2A.

In the wafer 100, the first groove 290 is continuous through the effective area 101 and the dummy area 102, and reaches the outer edge 110c of the substrate layer 110 when viewed in the facing direction. With this configuration, it is possible to further improve the yield at the time of cutting out a plurality of Fabry-Perot interference filters 1 from the wafer 100, and possible to further reliably suppress the warpage of the wafer 100.

In the wafer 100, the stress adjustment layer 400 is provided on the second surface 110b of the substrate layer 110, and the second groove 470 is formed in the stress adjustment layer 400 so as to correspond to the first groove 290. With this configuration, it is possible to further improve the yield at the time of cutting out a plurality of Fabry-Perot interference filters 1 from the wafer 100, and possible to further reliably suppress the warpage of the wafer 100. In a case where the second groove 470 is not formed in the stress adjustment layer 400 so as to correspond to the first groove 290, peeling, chipping, or the like are likely to occur at a cutting surface of the stress adjustment layer 400 when the plurality of Fabry-Perot interference filters 1 and the plurality of dummy filters 2 are cut out from the wafer 100, and this might cause degradation of the appearance, characteristics, or the like in the Fabry-Perot interference filter 1. Occurrence of such a situation is suppressed in the wafer 100 because the second groove 470 is formed in the stress adjustment layer 400 so as to correspond to the first groove 290.

In the wafer 100, the plurality of Fabry-Perot interference filter portions 1A and the plurality of dummy filter portions 2A are arranged so as to be symmetric with respect to the first straight line 3 and the second straight line 4 which are orthogonal to each other. This makes it possible to more reliably suppress the warpage of the entire wafer 100.

In a method of manufacturing the wafer 100, the gap S is formed in each of the Fabry-Perot interference filter portions 1A while the plurality of Fabry-Perot interference filter portions 1A is still in the state of the wafer 100. Accordingly, compared to a case of forming the gap S individually at a chip level, it is possible to form the gap S between the first mirror portion 31 and the second mirror portion 32 with significantly higher efficiency. Furthermore, since a process proceeds simultaneously in the effective area 101 at a portion corresponding to an arbitrary substrate 11 within the substrate layer 110 and portions corresponding to the surrounding substrates around the substrate 11, such as in the etching of the intermediate layer 230 simultaneously performed onto the plurality of two-dimensionally arranged portions 50 expected to be removed, it is possible to reduce an unevenness of in-plane stress in the substrate layer 110. Therefore, according to the method of manufacturing the wafer 100, it is possible to obtain the wafer 100 capable of stable mass-production of high-quality Fabry-Perot interference filters 1.

Furthermore, irradiation of the laser light L to form the modified region 7 inside the substrate layer 110 along each of the lines 5 and thereby cutting the wafer 100 along each of the lines 5 will be extremely effective in manufacturing the Fabry-Perot interference filter 1 for the following reasons. That is, cutting the wafer 100 using the laser light L needs no water and thus can suppress an incidence of damage onto the second mirror portion 32 floating on the gap S by water pressure and suppress sticking (phenomenon of stoppage of the second mirror portion 32 due to contact with the first mirror portion 31) caused by water intrusion into the gap S. Therefore, cutting the wafer 100 using the laser light L is extremely effective in manufacturing the Fabry-Perot interference filter 1.

[Modifications]

Although an embodiment of the present disclosure has been described as above, the present disclosure is not limited to the embodiment described above. For example, the material and the shape of each configuration are not limited to the materials and the shapes described above, and it is possible to employ various materials and shapes. In the wafer 100, when viewed in the thickness direction of the substrate layer 110, the outer shape of the Fabry-Perot interference filter portion 1A and the outer shape of the dummy filter portion 2A need not be the same. Furthermore, when cutting out a plurality of Fabry-Perot interference filters 1 from the wafer 100, there is no need to cut out all the dummy filter portions 2A (that is, it is not necessary to singulate all the dummy filter portions 2A).

Furthermore, as illustrated in FIG. 14, the wafer 100 may include the modified region 7 formed inside the substrate layer 110 so as to correspond to the first groove 290. Here, forming the modified region 7 so as to correspond to the first groove 290 means that the modified region 7 is formed to overlap the first groove 290 when viewed in the facing direction, and in particular, means the modified region 7 is formed along each of the lines 5. This enables the fracture to be extended from the modified region 7 in a thickness direction of the substrate layer 110, making it possible to easily and accurately cut out a plurality of Fabry-Perot interference filters 1 from the wafer 100. In this case, the expanding tape 60 may be attached to the second surface 110b side of the substrate layer 110. At this time, the outer edge portion of the expanding tape 60 attached to the wafer 100 is held by an annular frame. This facilitates handling of the wafer 100 even in a state where the modified region 7 is formed inside the substrate layer 110. In the wafer 100 in which the modified region 7 is formed inside the substrate layer 110, there is a possibility that a fracture may unexpectedly extend from the modified region 7. In the wafer 100, the plurality of dummy filter portions 2A, the first groove 290, and the second groove 470 are not provided in the pair of areas 102a of the dummy area 102. This can suppress the occurrence of a fracture and even where a fracture develops, the extension of the fracture would be stopped by the pair of areas 102a.

Figure 17:
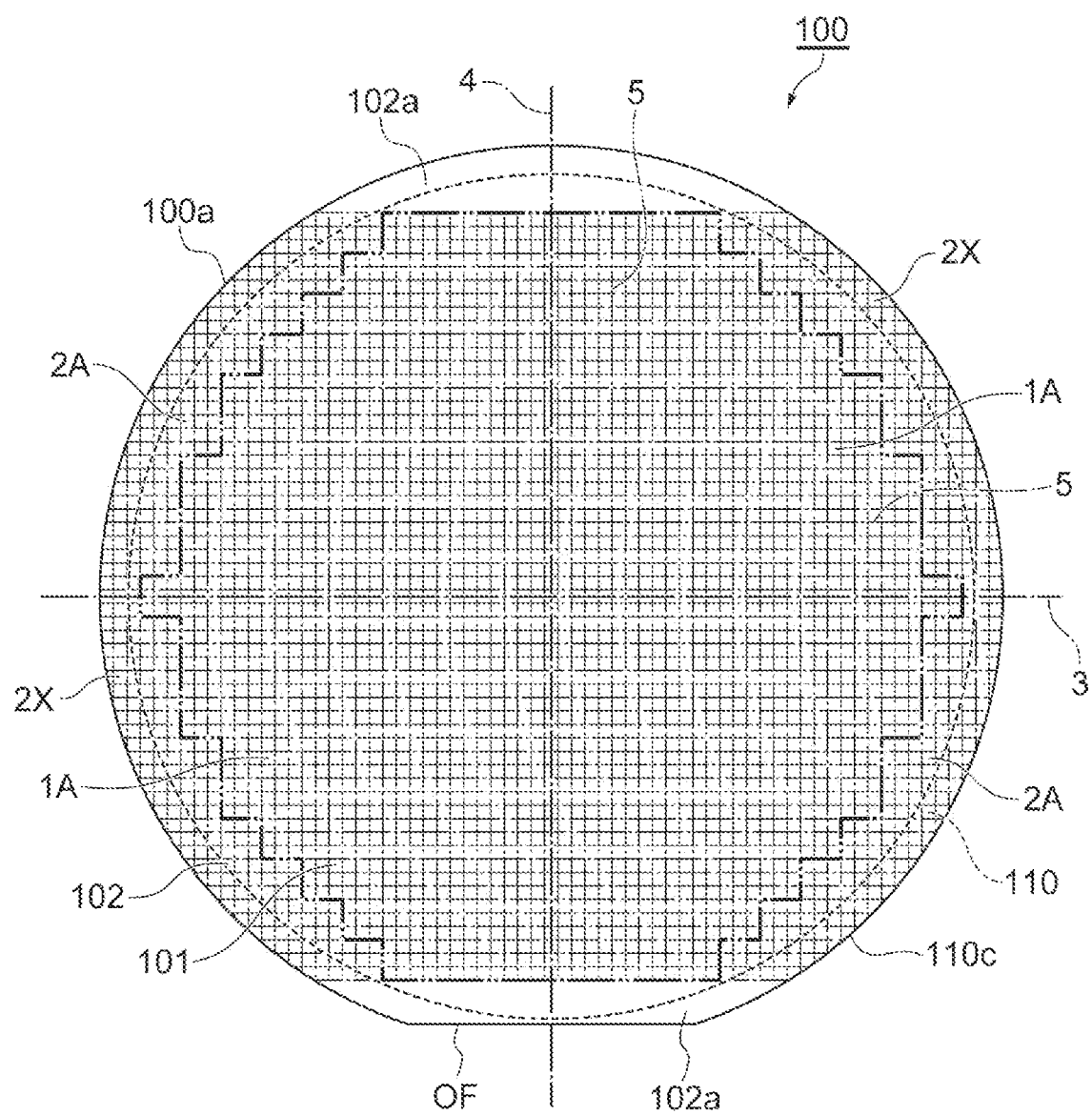
FIG. 17 is a plan view of a wafer according to a modification.

Furthermore, as illustrated in FIG. 17, a mirror-removed portion 2X may be formed in a portion of the dummy area 102. The mirror-removed portion 2X is formed by exposing the surface of the first mirror portion 31 without providing the second mirror portion 32 and the intermediate layer 23 (refer to (b) of FIG. 19). That is, the mirror-removed portion 2X differs from the dummy filter portion 2A in that the second mirror portion 32 and the intermediate layer 23 are not provided. In the wafer 100 illustrated in FIG. 17, a plurality of the mirror-removed portions 2X is provided in an annular region (region outside the broken line in FIG. 17) along the outer edge 110c of the substrate layer 110. The mirror-removed portion 2X is not limited to the one obtained by removing all of the second mirror portion 32 and the intermediate layer 23. It is allowable to obtain the mirror-removed portion 2X by removing at least a portion of the second mirror portion 32. That is, the mirror-removed portion 2X has a configuration in which a portion of the second mirror portion 32 is removed as a layer from the surface on the side opposite to the first mirror portion 31 and this removal leads to the absence of a layer on the first mirror portion 31 or thinning of the layer on the first mirror portion 31. In the mirror-removed portion 2X, not only the laminate on the first surface 110a side of the substrate layer 110 but also the laminate on the second surface 110b side of the substrate layer 110 may be thinned. For example, it is allowable to eliminate the stress adjustment layer 400 or thin the stress adjustment layer 400.

In the wafer 100 illustrated in FIG. 17, at least a portion of the second mirror portion 32 is removed from a portion of the dummy area 102, thereby forming the mirror-removed portion 2X. With this configuration, in a case where a plurality of through-holes 24b is to be formed in the second mirror portion 32 in a portion corresponding to each of the Fabry-Perot interference filter portions 1A in order to form the gap S by etching between the first mirror portion 31 and the second mirror portion 32 facing each other, for example, it is possible, by monitoring the removal state of the second mirror portion 32 in a portion corresponding to the mirror-removed portion 2X, to reliably form the plurality of through-holes 24b in the second mirror portion 32 at a portion corresponding to each of the Fabry-Perot interference filter portions 1A (details will be described below). This makes it possible to form the wafer 100 including a plurality of Fabry-Perot interference filter portions 1A in which the gap S is reliably formed between the first mirror portion 31 and the second mirror portion 32 facing each other.

Furthermore, in the wafer 100 illustrated in FIG. 17, at least the first mirror portion 31 is surrounded by the first groove 290 in the mirror-removed portion 2X. This can reduce the stress also in the mirror-removed portion 2X, suppressing the warpage of the wafer 100.

Furthermore, in the wafer 100 illustrated in FIG. 17, the mirror-removed portions 2X is provided in plurality along the outer edge 110c of the substrate layer 110 in the dummy area 102, and the first groove 290 is continuous through the effective area 101 and the dummy area 102, so as to reach the outer edge 110c of the substrate layer 110 when viewed in the facing direction. As an example, the plurality of mirror-removed portions 2X is continuously arranged along the outer edge 110c to form an area, and the area surrounds the effective area 101 and the dummy area 102 excluding the formed area when viewed in the facing direction. With this configuration, the plurality of dummy filter portions 2A is arranged outside the plurality of Fabry-Perot interference filter portions 1A, and the plurality of mirror-removed portions 2X is arranged outside the plurality of dummy filter portions 2A, and the first groove 290 is also continuous to reach the outer edge 110c of the substrate layer 110, leading to improvement of the stress balance of the entire wafer 100, making it possible to further reliably suppress the warpage of the wafer 100.

An example of a method for manufacturing the wafer 100 illustrated in FIG. 17 will be described. First, as illustrated in FIGS. 8 to 11, the reflection prevention layer 210 and the device layer 200 are formed on a first surface 110a of a substrate layer 110, while the first groove 290 is formed in the device layer 200. However, in a region where the plurality of mirror-removed portions 2X is provided (here, a region outside the broken line in FIG. 17), there is no need to provide a configuration related to the first electrode 12, the second electrode 13, the third electrode 14, and the plurality of terminals 15 and 16 (a metal film such as aluminum to form each of the terminals 15 and 16, through-holes for disposing the terminals 15 and 16, and the like), the opening 40a, and the like.

Subsequently, as illustrated in (a) of FIG. 18, etching is performed in each of portions corresponding to the Fabry-Perot interference filter portion 1A so as to form, in the second laminate 24, the plurality of through-holes 24b from the surface 24a of the second laminate 24 to the portion 50 expected to be removed. Together with this procedure, as illustrated in (b) of FIG. 18, the mask is removed from portions corresponding to the individual mirror-removed portions 2X, and etching is performed to remove the second laminate 24. At this time, the emission spectrum of the plasma (emission of a specific wavelength depending on the material of the layer being etched) is monitored in a portion corresponding to each of the mirror-removed portions 2X in order to determine the timing of completion of etching.

The reason why the emission spectrum of the plasma is monitored in the portion corresponding to each of the mirror-removed portions 2X is as follows. That is, each of the through-holes 24b is formed in a size that would not substantially influence the function of the second mirror portion 32. Therefore, a change in the intensity of the emission spectrum cannot be easily observed by monitoring the emission spectrum of the plasma emitted from the portion corresponding to each of the through-holes 24b. To handle this, by monitoring the emission spectrum of the plasma in a portion corresponding to each of the mirror-removed portions 2X including the identical second laminate 24, it is possible to accurately determine the timing of the completion of the etching, leading to high-accuracy formation of the plurality of through-holes 24b in the second laminate 24 in portions corresponding to each of the Fabry-Perot interference filter portions 1A. Note that, as described above, the plurality of through-holes 24b will not be formed in the second laminate 24 (refer to (b) of FIG. 12) in the portion corresponding to each of the dummy filter portions 2A.

Figure 18:
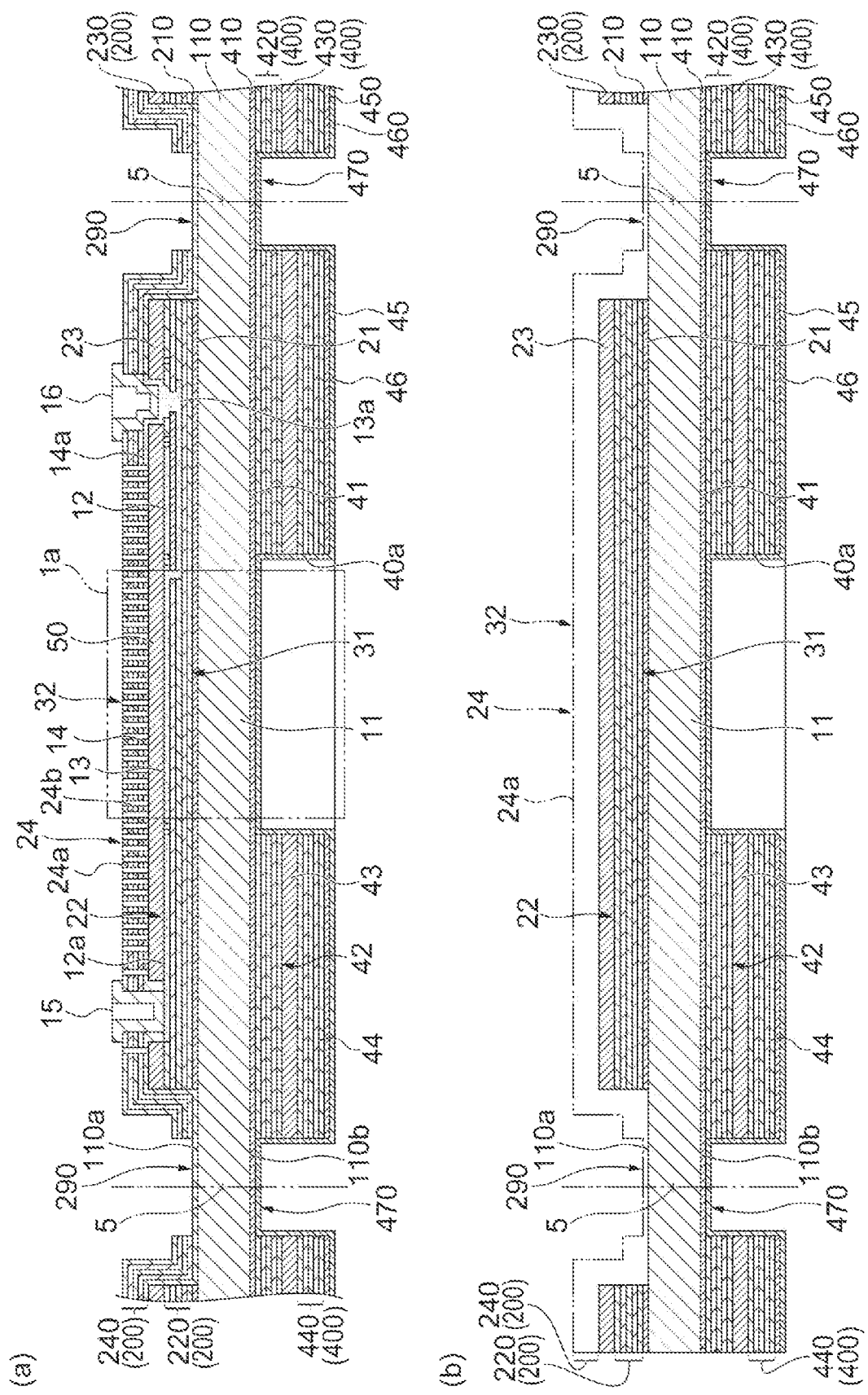
FIG. 18 is a cross-sectional view illustrating a method for manufacturing the wafer illustrated in FIG. 17.

Subsequently, as illustrated in FIG. 18, a light shielding layer 450 is formed on the layer 440. Subsequently, etching is performed to remove a portion along each of the lines 5 in the light shielding layer 450 and the stress adjustment layer 400 (that is, the layers 420, 430, and 440) so as to expose the surface of the reflection prevention layer 410. In addition, the etching is performed to form the opening 40a in each of portions corresponding to the substrate 11. Subsequently, the protective layer 460 is formed on the light shielding layer 450, the exposed surface of the reflection prevention layer 410, an inner surface of the opening 40a, and the side surface of the stress adjustment layer 400 facing the second groove 470.

Figure 19:
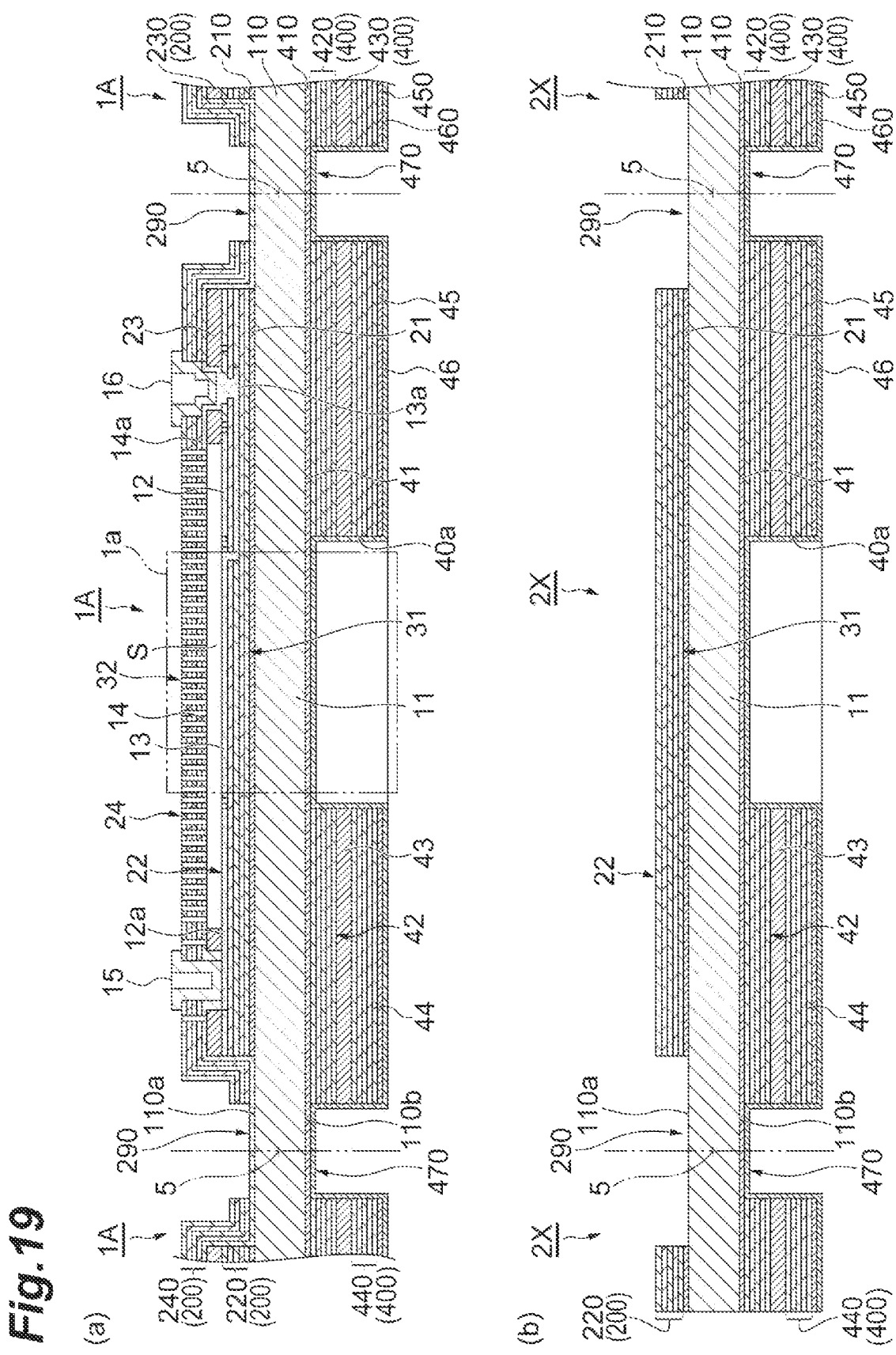
FIG. 19 is a cross-sectional view illustrating a method for manufacturing the wafer illustrated in FIG. 17.

Subsequently, as illustrated in (a) of FIG. 19, etching via a plurality of through-holes 24b (for example, gas phase etching using hydrofluoric acid gas) is performed at a portion corresponding to each of the Fabry-Perot interference filter portions 1A to collectively remove the plurality of portions 50 expected to be removed from the intermediate layer 230. With this procedure, a gap S is formed in the portion corresponding to each of the Fabry-Perot interference filter portions 1A for each of portions corresponding to the substrate 11. At this time, as illustrated in (b) of FIG. 19, since the second laminate 24 has been removed in the portion corresponding to each of the mirror-removed portions 2X, the intermediate layer 23 has been removed to expose the surface of the first mirror portion 31. Note that since the plurality of through-holes 24b is not formed in the second laminate 24 at the portion corresponding to each of the dummy filter portions 2A as described above, the gap S will not be formed in the intermediate layer 230 (refer to (b) of FIG. 13).

With the procedure described above, as illustrated in (a) of FIG. 7, the gap S is formed between the first mirror portion 31 and the second mirror portion 32 facing each other in the effective area 101, thereby forming the plurality of Fabry-Perot interference filter portions 1A. In contrast, in the dummy area 102, the intermediate layer 23 is provided between the first mirror portion 31 and the second mirror portion 32 facing each other as illustrated in (b) of FIG. 7, thereby forming the plurality of dummy filter portion 2A. Furthermore, in a portion of the dummy area 102, the second mirror portion 32 and the intermediate layer 23 are not provided, as illustrated in (b) of FIG. 19 so as to expose the surface of the first mirror portion 31, thereby forming the mirror-removed portion 2X.

REFERENCE SIGNS LIST

1: Fabry-Perot interference filter, 1A: Fabry-Perot interference filter portion, 2: dummy filter, 2A: dummy filter portion, 2X: mirror-removed portion, 3: first straight line, 4: second straight line, 7: modified region, 23: intermediate layer, 31: first mirror portion, 32: second mirror portion, 60: expanding tape, 100: wafer, 101: effective area, 102: dummy area, 110: substrate layer, 110a: first surface, 110b: second surface, 110c: outer edge, 220: first mirror layer, 240: second mirror layer, 290: first groove, 400: stress adjustment layer, 470: second groove, S: gap.

The invention claimed is:

1. A wafer comprising:
a substrate layer having a first surface and a second surface opposite to the first surface;
a first mirror layer having a plurality of first mirror portions two-dimensionally arranged on the first surface; and
a second mirror layer having a plurality of second mirror portions two-dimensionally arranged on the first mirror layer,
wherein a plurality of Fabry-Perot interference filter portions are formed in an effective area, in each of the plurality of Fabry-Perot interference filter portions a gap is formed between the first mirror portion and the second mirror portion facing each other and a distance between the first mirror portion and the second mirror portion facing each other varies by an electrostatic force, a plurality of dummy filter portions are formed in a dummy area disposed along an outer edge of the substrate layer and surrounding the effective area, in each of the plurality of dummy filter portions an intermediate layer is provided between the first mirror portion and the second mirror portion facing each other, and a groove extends along a boundary between the effective area and the dummy area, the groove opening on a side opposite to the substrate layer.

2. The wafer according to claim 1, wherein the groove includes a plurality of straight portions, and each of the plurality of straight portions extends along two or more of the plurality of Fabry-Perot interference filter portions.

3. The wafer according to claim 1, wherein at least the second mirror portion is surrounded by a first groove opening on a side opposite to the substrate layer in each of the plurality of Fabry-Perot interference filter portions, and the groove includes a part of the first groove.

4. The wafer according to claim 3, wherein the plurality of dummy filter portions is provided in an area of the dummy area excluding a first area and a second area, the first area is an area along an orientation flat formed at a portion of the substrate layer, the second area is an area along a part of the outer edge of the substrate layer on a side opposite to the orientation flat, and at least the second mirror portion is surrounded by the first groove in each of the plurality of dummy portions.

5. The wafer according to claim 1, further comprising a stress adjustment layer provided on the second surface, wherein a second groove opening on an opposite side of the substrate layer is formed in the stress adjustment layer, and the second groove is formed so as to correspond to the groove.

6. The wafer according to claim 1, wherein the plurality of Fabry-Perot interference filter portions and the plurality of dummy filter portions are disposed so as to be symmetric about each of a first straight line and a second straight line passing through a center of the substrate layer and orthogonal to each other when viewed in the direction in which the first mirror portion and the second mirror portion face each other.

* * * * *